(12) United States Patent
Lodato et al.

(10) Patent No.: US 10,699,749 B2
(45) Date of Patent: *Jun. 30, 2020

(54) METHODS AND SYSTEMS FOR CUSTOMIZING VIRTUAL REALITY DATA

(71) Applicant: Verizon Patent and Licensing Inc., Arlington, VA (US)

(72) Inventors: Michael Lodato, Clinton, NJ (US); Pai Moodlagiri, Clinton, NJ (US); Rene Sepulveda, Fairfax Station, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/267,227

(22) Filed: Feb. 4, 2019

(65) Prior Publication Data
US 2019/0172496 A1 Jun. 6, 2019

Related U.S. Application Data

(63) Continuation of application No. 15/610,607, filed on May 31, 2017, now Pat. No. 10,255,949.

(51) Int. Cl.
*G11B 27/036* (2006.01)
*G11B 27/10* (2006.01)
(Continued)

(52) U.S. Cl.
CPC .......... *G11B 27/036* (2013.01); *G06T 19/006* (2013.01); *G11B 27/10* (2013.01); *H04N 5/9201* (2013.01); *H04N 9/8205* (2013.01); *H04N 13/161* (2018.05); *H04N 13/189* (2018.05); *H04N 13/204* (2018.05); *H04N 13/366* (2018.05); *H04N 19/597* (2014.11); *H04N 21/21805* (2013.01); *H04N 21/23605* (2013.01);
(Continued)

(58) Field of Classification Search
CPC .. H04N 13/189; H04N 13/204; H04N 13/161; H04N 13/366; H04N 21/23605; H04N 21/23614; H04N 21/8146; G06T 19/006
See application file for complete search history.

(56) References Cited

U.S. PATENT DOCUMENTS

| | | | |
|---|---|---|---|
| 2016/0042475 A1* | 2/2016 | Tapia | G06Q 50/01 386/224 |
| 2016/0255327 A1 | 9/2016 | Cole et al. | |
| 2017/0339392 A1* | 11/2017 | Forutanpour | H04N 19/597 |

\* cited by examiner

*Primary Examiner* — Thai Q Tran
*Assistant Examiner* — Jose M Mesa

(57) ABSTRACT

An exemplary virtual reality system accesses metadata describing a plurality of frame sequences that each include two-dimensional color data frames and depth data frames that depict a different view of a three-dimensional (3D) scene. The virtual reality system identifies a set of experience parameters defining a particular virtual reality experience associated with the 3D scene and that is to be experienced by a user using a media player device. Based on the metadata and the set of experience parameters, the virtual reality system selects frame sequences from the plurality of frame sequences for inclusion in a frame sequence subset that is customized to the particular virtual reality experience and that collectively includes data sufficient to allow the media player device to generate a virtual 3D representation of the 3D scene. The virtual reality system also provides the selected frame sequences of the frame sequence subset to the media player device.

20 Claims, 20 Drawing Sheets

(51) Int. Cl.
*H04N 13/161* (2018.01)
*H04N 13/189* (2018.01)
*H04N 13/204* (2018.01)
*H04N 13/366* (2018.01)
*H04N 19/597* (2014.01)
*H04N 13/257* (2018.01)
*H04N 13/324* (2018.01)
*H04N 21/236* (2011.01)
*H04N 21/81* (2011.01)
*H04N 21/218* (2011.01)
*H04N 21/472* (2011.01)
*H04N 9/82* (2006.01)
*G06T 19/00* (2011.01)
*H04N 5/92* (2006.01)

(52) U.S. Cl.
CPC . *H04N 21/23614* (2013.01); *H04N 21/47217* (2013.01); *H04N 21/816* (2013.01); *H04N 21/8146* (2013.01); *H04N 13/257* (2018.05); *H04N 13/324* (2018.05)

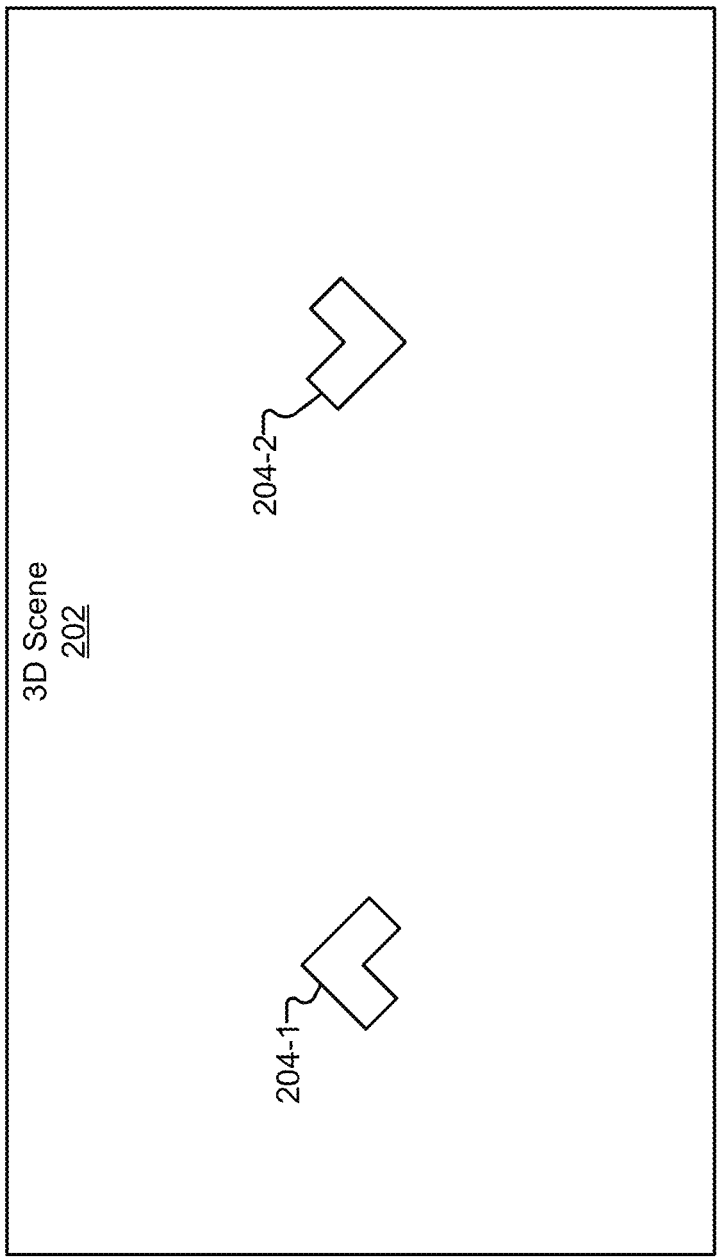

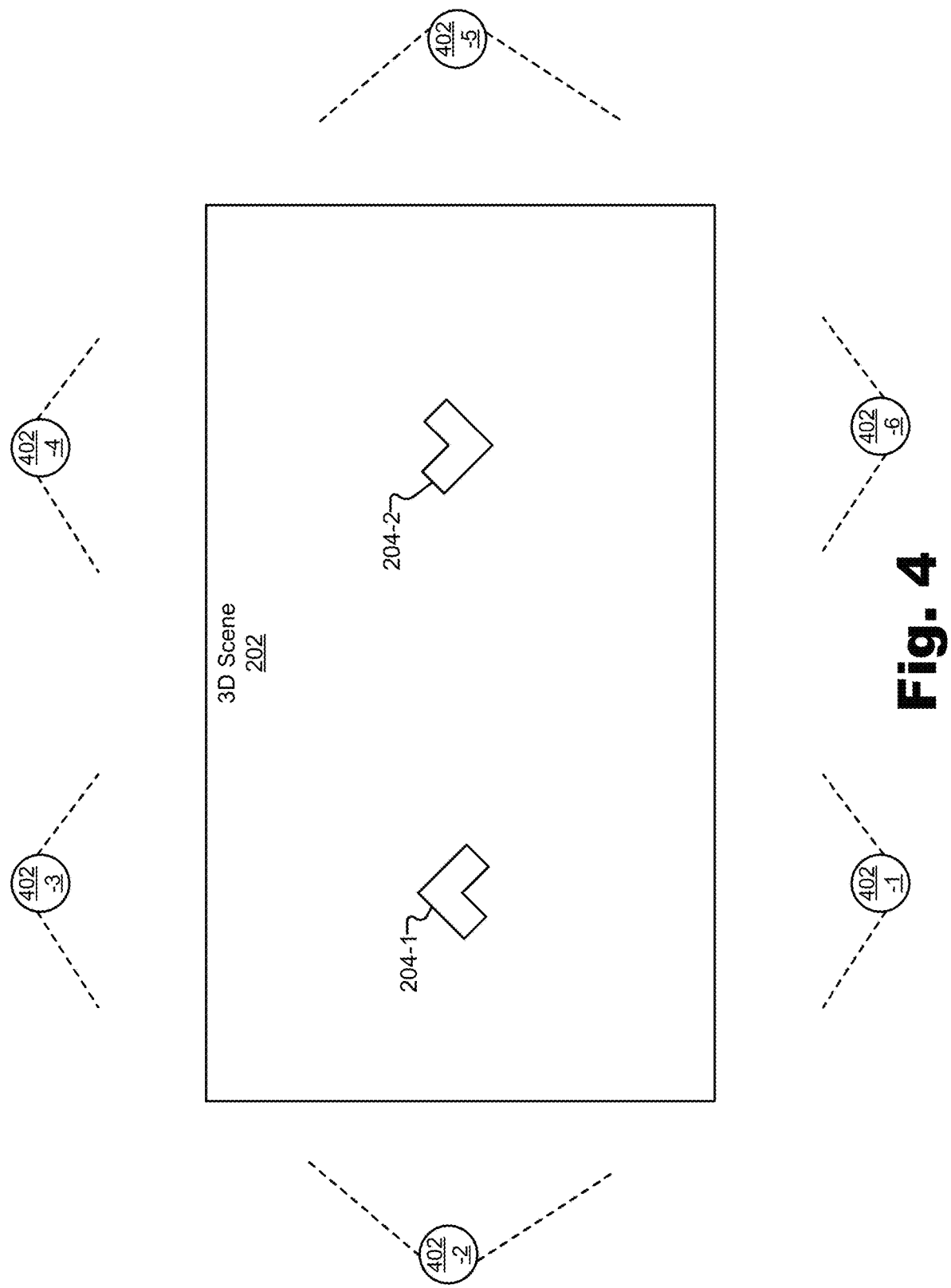

Frame Sequence Subsets

| Entry # | Experience parameters | Surface data frame sequences |
|---|---|---|
| 1 | Loc 1, std device, std scene, no objects | 1, 2, 9, 10, 16, 32 |
| 2 | Loc 2, std device, std scene, no objects | 3, 10, 11, 16, 18, 33 |
| 3 | Loc 3, std device, std scene, no objects | 4, 11, 12, 16, 19, 34 |
| ⋮ | ⋮ | ⋮ |
| 8 | Loc 8 (custom), std device, std scene, object 204-1 nearby | 10, 11, 18, 19, 24, 25, + custom |
| ⋮ | ⋮ | ⋮ |
| 18 | Loc 18, std device, std scene, no objects | 7, 23, 29, 30, 37, 38 |

800-1, 800-2, 800-3 → entries 1, 2, 3
800-8 → entry 8
800-18 → entry 18

Fig. 8

METHODS AND SYSTEMS FOR CUSTOMIZING VIRTUAL REALITY DATA

RELATED APPLICATIONS

This application is a continuation application of U.S. patent application Ser. No. 15/610,607, filed May 31, 2017, and entitled "Methods and Systems for Customizing Virtual Reality Data," which is hereby incorporated by reference in its entirety.

BACKGROUND INFORMATION

A virtual reality media provider may provide virtual reality data to a media player device that processes the virtual reality data in order to provide a virtual reality experience to a user of the media player device. For example, by way of a particular virtual reality experience, the user may be immersed into an interactive virtual reality world that the user may experience by directing his or her attention to any of a variety of things being presented in the virtual reality world at the same time. For example, the user may look around the virtual reality world in any direction, giving the user a sense that he or she is actually present in and experiencing the virtual reality world from a particular location and perspective (e.g., angle, viewpoint, etc.) within the virtual reality world.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 2 illustrates an exemplary three-dimensional ("3D") scene with which virtual reality experiences presented to a user may be associated according to principles described herein.

FIG. 4 illustrates a plurality of views of the 3D scene of FIG. 2 that may be captured by different capture devices according to principles described herein.

FIG. 8 illustrates exemplary frame sequence subsets upon which different virtual reality datasets corresponding to different entries in an experience selection data structure are based according to principles described herein.

DETAILED DESCRIPTION OF PREFERRED EMBODIMENTS

Figure 1:
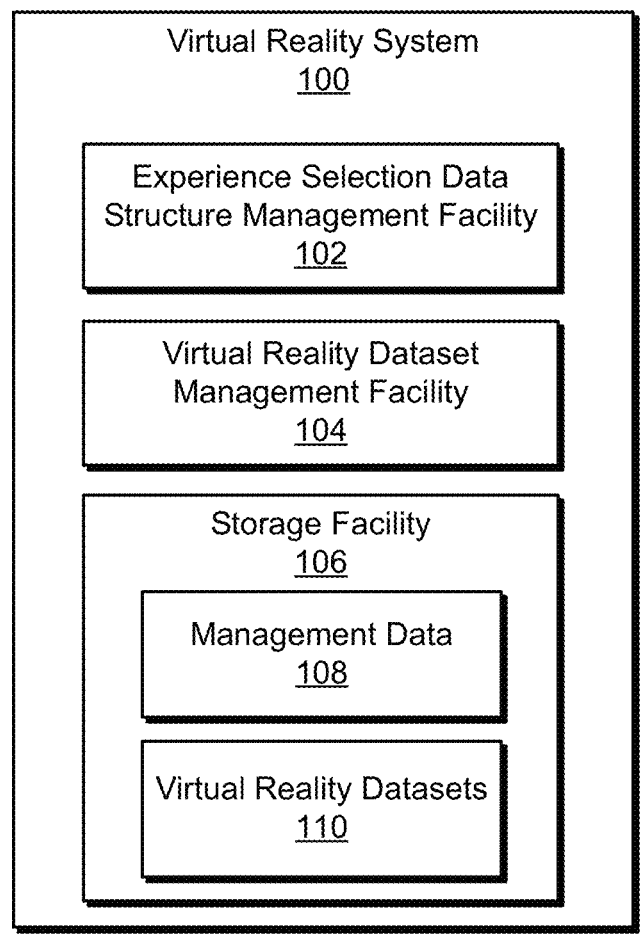
FIG. 1 illustrates an exemplary virtual reality system for customizing virtual reality data according to principles described herein.

In certain virtual reality experiences, multiple users associated with multiple different media player devices may wish to experience the same virtual reality world at the same time. For example, the virtual reality media provider may provide virtual reality data representative of a particular three-dimensional ("3D") scene of a particular virtual reality world that multiple different users may desire to experience using respective media player devices. Accordingly, the virtual reality media provider may provide the same virtual reality data to each media player device that requests the virtual reality data to thereby allow all the media player devices to process the virtual reality data and provide respective virtual reality experiences to the respective users.

To this end, methods and systems for customizing virtual reality data are described herein. For example, as will be described in more detail below, an exemplary virtual reality system may access metadata descriptive of a plurality of surface data frame sequences (e.g., sequences of color and depth frames) that each depict a different view of a three-dimensional ("3D") scene. As described in the metadata, for instance, a relatively large number of surface data frame sequences may include data representative of the 3D scene as captured from a relatively large number of different locations, angles, fields of view, etc., with respect to the 3D scene.

The virtual reality system may also identify a set of experience parameters descriptive of a particular virtual reality experience included within a plurality of virtual reality experiences associated with the 3D scene. Each of the plurality of virtual reality experiences (i.e., including the particular virtual reality experience) may be providable to a user by a media player device. For instance, the different virtual reality experiences within the plurality of providable virtual reality experiences may each be associated with different regions of the 3D scene from which the virtual reality experiences may be provided to respective users, or with various other parameters that may be defined for the virtual reality experiences as will be described below. As such, the media player device may be configured to provide the virtual reality experiences to the user by processing respective virtual reality datasets that are customized to respective virtual reality experiences in the plurality of virtual reality experiences (e.g., including a particular virtual reality dataset that is customized to the particular virtual reality experience). For example, virtual reality datasets customized to virtual reality experiences associated with certain regions of the 3D scene may include more detail about certain aspects of the 3D scene and less detail about other aspects of the 3D scene than may be included within virtual reality datasets customized to virtual reality experiences associated with other regions of the 3D scene.

Based on the identified set of experience parameters and the metadata associated with the plurality of data frame sequences, the virtual reality system may select surface data frame sequences from the plurality of surface data frame sequences for inclusion in a frame sequence subset upon which the particular virtual reality dataset is based (e.g., upon which the particular virtual reality dataset will be based when the virtual reality dataset is generated). For example, a frame sequence subset including a relatively small number of surface data frame sequences may be selected from the relatively large number of available surface data frame sequences in the plurality of surface data frame sequences to allow the particular virtual reality dataset based on the frame sequence subset to be customized to the particular virtual reality experience (e.g., to include certain details of the 3D scene relevant to the particular virtual reality experience while excluding other less relevant details).

Based on the selection of the surface data frame sequences for inclusion in the frame sequence subset, the virtual reality system may include an entry corresponding to the particular virtual reality dataset within an experience selection data structure. More specifically, the virtual reality system may generate an experience selection data structure configured to facilitate dynamic selection of different entries (e.g., from a plurality of entries included within the experience selection data structure) by the media player device as the media player device processes different virtual reality datasets to provide different virtual reality experiences to the user, and may include the entry corresponding to the particular virtual reality dataset within the generated experience selection data structure. Just as the entry corresponds to the particular virtual reality dataset customized to the particular virtual reality experience, each of the plurality of entries within the experience selection data structure may correspond to a different virtual reality dataset that is customized to a different virtual reality experience included within the plurality of providable virtual reality experiences.

Once the experience selection data structure has been generated to include the entry corresponding to the particular virtual reality dataset that is customized to the particular virtual reality experience, the virtual reality system may provide the experience selection data structure to the media player device. The virtual reality system may then detect that the media player device selects (e.g., by way of the provided experience selection data structure and from the plurality of entries included in the experience selection data structure) the entry corresponding to the particular virtual reality dataset that is customized to the particular virtual reality experience. In response to the detecting that the media player device selects the entry corresponding to the particular virtual reality dataset, the virtual reality system may provide, to the media player device, the particular virtual reality dataset that is customized to the particular virtual reality experience. As a result, the media player device may receive the particular virtual reality dataset and process the particular virtual reality dataset to provide the particular virtual reality experience to the user.

Systems and methods for customizing virtual reality data described herein may provide various advantages and benefits. As one example, systems and methods described herein may allow virtual reality media provider systems to efficiently distribute virtual reality data that is dynamically customized to particular experiences being provided to particular users. By customizing virtual reality data that is distributed, redundant and/or irrelevant data transmitted to any particular media player device may be significantly reduced. As such, provider systems employing methods and systems described herein may allow higher quality and/or more immersive experiences to be provided to users (e.g., experiences characterized by higher image quality, more vivid detail, etc.) even while distributing less data to the media player devices used by the users, as compared to conventional provider systems that do not employ methods and systems described herein.

Additionally or alternatively, systems and methods described herein may facilitate practical, efficient, and high-quality distribution of virtual reality data to multiple users (e.g., even including very large numbers of users) at the same time. For example, a virtual reality media provider system having access to many surface data frame sequence options (e.g., including virtualized surface data frame sequences, as will be described below) may benefit from increased flexibility in selecting the data the system provides to particular media player devices at particular times. For instance, rather than distributing all of the data (e.g., high volumes of high-resolution data) that may be available to depict every aspect of a 3D scene, which may be impractical or impossible due to the large quantity of the data, methods and systems described herein may facilitate more selective and flexible distribution of customized data.

As one specific example, a virtual reality dataset customized to a first virtual reality experience (e.g., data representative of a few surface data frame sequences selected from a large number of available surface data frame sequences) may be distributed to a first media player device to provide a high level of detail of one part of a 3D scene relevant to a user having the first virtual reality experience using the first media player device. At the same time, a virtual reality dataset customized to a second virtual reality experience (e.g., data representative of different surface data frame sequences) may be distributed to a second media player device to provide a high level of detail of a different part of the 3D scene relevant to a different user having the second virtual reality experience using the second media player device. As such, a virtual reality media provider system may concurrently provide both the first and second media player devices with individually customized virtual reality datasets that are relevant to the respective users (e.g., that include localized data customized for respective parts of the 3D scene that the users are experiencing) while not overloading either media player device or any distribution channels used to communicate with the media player devices with excessive amounts of redundant data or detailed data about parts of the 3D scene that are less relevant to the respective users (e.g., details that would not be appreciable to the users anyway). As such, data distribution may be improved (e.g., made more efficient, faster, and more effective by requiring less data to be distributed to client-side media player devices) even as user experiences are improved (e.g., made more realistic and immersive due to the customization of virtual reality datasets to dynamically include high-quality representations of only the most relevant parts of the 3D scene).

Additionally, as will be made apparent herein, methods and systems for customizing virtual reality data described herein may facilitate media player devices in dynamically tracking and requesting appropriate virtual reality datasets for the different virtual reality experiences that users of the media player devices are having by making use of the experience selection data structures described herein. In this way, media player devices may continuously and efficiently receive customized data even while the task of tracking user experiences being provided by different media player devices may be reduced for provider systems. Moreover, disclosed methods and systems for customizing virtual reality data may be highly scalable to allow provider systems to support 3D scenes of arbitrary size (e.g., very large 3D scenes), 3D scenes of arbitrary quality (e.g., 3D scenes captured by advanced capture devices, etc.), 3D scenes that are very dynamic and active (e.g., 3D scenes including large numbers of objects and interaction between objects, etc.), and other immersive 3D scenes.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary virtual reality system 100 ("system 100") for customizing virtual reality data. As shown, system 100 may include, without limitation, an experience selection data structure management facility 102 ("management facility 102"), a virtual reality dataset management facility 104 ("management facility 104") and a storage facility 106 selectively and communicatively coupled to one another. It will be recognized that although facilities 102 through 106 are shown to be separate facilities in FIG. 1, facilities 102 through 106 may be combined into fewer facilities, such as into a single facility, or divided into more facilities as may serve a particular implementation. In some examples, each of facilities 102 through 106 may be distributed between multiple computing devices (e.g., multiple servers) and/or multiple locations as may serve a particular implementation. Additionally, in certain implementations of system 100, certain facilities shown in FIG. 1 (and the associated functionality associated with such facilities) may be omitted from system 100. For instance, a particular implementation of system 100 may include only management facility 102 and storage facility 106, another implementation of system 100 may include only management facility 104 and storage facility 106, and so forth. Each of facilities 102 through 106 will now be described.

Management facility 102 may include one or more physical computing devices (e.g., hardware and/or software components such as processors, memories, communication interfaces, instructions stored in memory for execution by the processors, etc.) that perform various operations associated with designing, planning, generating, and otherwise managing an experience selection data structure that includes a plurality of entries and is configured to facilitate dynamic selection of different entries from the plurality of entries by a media player device as the media player device provides different virtual reality experiences to a user. To this end, management facility 102 may access metadata descriptive of a plurality of surface data frame sequences that each depict a different view of a 3D scene.

Management facility 102 may access the metadata in any manner as may serve a particular implementation. For instance, in certain embodiments, the 3D scene may be a real-world scene and one or more of the surface data frame sequences in the plurality of surface data frame sequences may be captured (e.g., generated) by a different capture device in a plurality of capture devices disposed at different locations with respect to the real-world scene so as to capture the different views of the real-world scene. As such, management facility 102 may access the metadata by accessing (e.g., receiving, requesting and acquiring, etc.) the captured surface data frame sequences directly from the plurality of capture devices. In other examples, one or more other systems (e.g., a real-world scene capture system) may intermediate between the capture devices and system 100 such that management facility 102 may access the metadata by way of the one or more other systems. Additionally, along with metadata descriptive of captured surface data frame sequences, management facility 102 may also access metadata descriptive of virtualized surface data frame sequences (i.e., surface data frame sequences derived from or rendered based on one or more of the captured surface data frame sequences) in similar ways. Captured and virtualized surface data frame sequences will be described in more detail below.

Management facility 102 may also identify a set of experience parameters descriptive of a particular virtual reality experience included within a plurality of virtual reality experiences associated with the 3D scene and that are each providable to a user by the media player device when the media player device processes a virtual reality dataset that is customized to each of the virtual reality experiences. Management facility 102 may identify the set of experience parameters (along with identifying additional sets of experience parameters descriptive of the other virtual reality experiences included within the plurality of virtual reality experiences) in any suitable manner. For instance, management facility 102 may divide up a 3D scene into different regions based on particular attributes of the 3D scene and designate the regions with respective parameters included within each set of experience parameters. As another example, management facility 102 may determine what media player device technical capabilities are to be supported for the 3D scene and designate respective parameters representative of the supported technical capabilities to be included within each set of experience parameters. Various examples of experience parameters that may be included in a set of experience parameters will be described below.

Based on the identified set of experience parameters and the metadata associated with the plurality of data frame sequences, management facility 102 may select surface data frame sequences from the plurality of surface data frame sequences for inclusion in a frame sequence subset upon which a particular virtual reality dataset (e.g., a virtual reality dataset that is customized to the particular virtual reality experience) is based. Put another way, management facility 102 may select surface data frame sequences for inclusion in the frame sequence subset upon which the particular virtual reality dataset will be based when the particular virtual reality dataset is generated (e.g., by management facility 104, as described below).

Based on the selection of the surface data frame sequences for inclusion in the frame sequence subset (i.e., the frame sequence subset upon which the particular virtual reality dataset is based), management facility 102 may generate an experience selection data structure and may include, within the experience selection data structure, an entry corresponding to the particular virtual reality dataset. For example, as described above, the plurality of entries included within the experience selection data structure (e.g., including the entry corresponding to the particular virtual reality dataset) may each correspond to a different virtual reality dataset customized to a different virtual reality experience included within the plurality of virtual reality experiences. As such, management facility 102 may generate the experience selection data structure to facilitate dynamic selection of different entries by the media player device as the media player device provides different virtual reality experiences to the user (e.g., as the user of the media player device causes a virtual viewpoint to move from region to region within the 3D scene). Management facility 102 may further perform other operations described herein and/or as may serve a particular implementation of system 100.

Management facility 104 may include one or more physical computing components (e.g., hardware and/or software components separate from those of management facility 102 or shared with management facility 102) that perform various operations associated with interacting with media player devices and providing different virtual reality datasets to the media player devices as the media player devices provide different virtual reality experiences to different users. Specifically, for example, management facility 104 may provide the experience selection data structure generated by management facility 102 to a media player device, detect that the media player device selects (e.g., by way of the experience selection data structure) the entry corresponding to the particular virtual reality dataset that is customized to the particular virtual reality experience, and, in response to the detection, provide (i.e., to the media player device) the particular virtual reality dataset that is customized to the particular virtual reality experience. Management facility 104 may further perform other operations described herein and/or as may serve a particular implementation of system 100.

As described above, management facilities 102 and 104 may communicate various data (e.g., metadata, sets of experience parameters, experience selection data structures, entry selections, virtual reality datasets, etc.) with various server-side and client-side devices and systems in a virtual reality media provider pipeline. As used herein, "server-side" may refer to a server side (e.g., a provider's side) of a server-client transaction such as a transaction where a content provider system provides data (e.g., virtual reality data) to a client device used by an end user. For example, a virtual reality media provider system may provide virtual reality data to a media player device associated with a user. As such, server-side systems and components may refer to those systems and components that are associated with (e.g., included within, implemented by, interoperate with, etc.) the content provider system to provide data (e.g., virtual reality datasets) to the media player device (e.g., by way of a network). In contrast, "client-side" devices may be associated with the client device (e.g., the media player device) used by the user on the other side of the network, and may include devices that facilitate the client device with receiving the data from the content provider system (e.g., the media player device and/or other computer components operated by the user on the user's side of the network). To perform these communications, management facilities 102 and 104 may be configured to communicate with server-side and/or client-side systems using any communication interfaces, protocols, and/or technologies as may serve a particular implementation. For example, management facilities 102 and 104 may be configured to communicate by way of one or more networks (e.g., wired or wireless local area networks, wide area networks, provider networks, the Internet, etc.), wired communication interfaces (e.g., Universal Serial Bus ("USB")), wireless communication interfaces, or any other suitable communication interfaces, protocols, and/ or technologies.

Storage facility 106 may store and/or maintain any suitable data accessed, received, generated, managed, tracked, maintained, used, provided, and/or transmitted by management facilities 102 and 104 in a particular implementation. For example, as shown, storage facility 106 may include management data 108 and/or virtual reality datasets 110 that may be received, generated, managed, tracked, maintained, used, and/or transmitted (e.g., provided to other systems) in any of the ways described herein. Management data 108 may include surface data frame sequence data including metadata descriptive of the surface data frame sequences (e.g., sets of capture parameters associated with the surface data frame sequences), data representative of the 3D scene, data representative of different sets of experience parameters or used for generating the sets of experience parameters, data representative of frame sequence subsets and selected surface data frame sequences included within the frame sequence subset, data used to perform the selection of the frame sequence subsets, data representative of experience selection data structures and/or data used to generate (e.g., dynamically generate) the experience selection data structures, and the like. Virtual reality datasets 110 may include data streams (e.g., video data streams encoded based on surface data frame sequences) that may be packaged into one or more transport streams for transport to media player devices and/or any other data associated with virtual reality datasets that may be provided to the media player devices. Moreover, storage facility 106 may include other types of data used by particular implementations of system 100 such as instructions (e.g., programming instructions) for performing the operations described herein and/or other data used by management facilities 102 and 104 to perform the operations described herein.

In some examples, the 3D scene may include elements of a real-world scene captured by a plurality of capture devices disposed at different locations with respect to the real-world scene so as to capture different views of the real-world scene. In some of these examples, system 100 may perform one or more of the operations described herein in real time as events are occurring within the real-world scene. Accordingly, in implementations where system 100 is used within a virtual reality media provider pipeline in which other systems also operate in real time, virtual reality datasets may be provided to media player devices so that respective users of the media player devices, who may not be physically located near the real-world scene but who may wish to experience the real-world scene (e.g., the events occurring within the real-world scene), may virtually experience the real-world scene and the events occurring therein live (e.g., in real time as the events are occurring) using their respective media player devices. While data processing and data distribution may take a finite amount of time such that it may be impossible for a user to experience the real-world scene precisely as events within the real-world scene occur, as used herein, an operation is considered to be performed in "real time" when the operation is performed immediately and without undue delay. Accordingly, a user may be said to experience a real-world scene in real time even if the user experiences particular events within the real-world scene after a delay (e.g., a few seconds or minutes after the occurrences actually take place).

To further illustrate how various implementations of system 100 may operate to customize virtual reality data, various aspects of operations performed by system 100 and/or operations performed by media player devices to provide virtual reality experiences to users will now be described.

FIG. 2 illustrates an exemplary 3D scene 202 with which virtual reality experiences presented to a user may be associated. For example, 3D scene 202 may represent a real-world scene including real-world objects, a virtual scene including virtual objects, a merged reality scene including a combination of real-world objects and virtual objects, or another suitable 3D scene as may serve a particular implementation.

As used herein, a real-world scene may represent any real-world scenery, real-world location, real-world event (e.g., live event, etc.), or other subject existing in the real world (e.g., as opposed to existing only in a virtual world or an imaginary world) as may serve a particular implementation. In some examples, a real-world scene may be a specifically delineated area such as a stage, a playing surface (e.g., a basketball court), an arena, or the like. Conversely, in other examples, real-world scenes may not be so well defined or delineated. For example, real-world scenes may include any indoor or outdoor real-world location such as a city street, a museum, a scenic landscape, or the like. In certain examples, real-world scenes may be associated with real-world events such as sporting events, musical events, dramatic or theatrical presentations, large-scale celebrations (e.g., New Year's Eve on Times Square, Mardis Gras, etc.), political events, or other real-world events. In the same or other examples, real-world scenes may be associated with settings for fictionalized scenes (e.g., a set of a live-action virtual reality television show or movie) and/or any other scenes at any other indoor or outdoor real-world location as may serve a particular implementation.

In contrast, as used herein, virtual scenes may represent the same types of subjects as real-world scenes, but may not have analogs in the real world. For example, virtual scenes may be entirely computer generated (e.g., as opposed to being captured by physical capture devices) and, as such, may model real-world locations or imaginary locations as may serve a particular implementation. In some instances, virtual scenes may include exotic elements that do not exist in the real world or would be difficult to capture in the real world (e.g., fantasy elements, landscapes of other planets, etc.).

As used herein, merged reality scenes may include elements of both real-world scenes and virtual scenes. For example, a merged reality scene may include scenery captured from a real-world scene (e.g., the inside of a famous building) but may integrate virtual objects within the real-world scenery. In other examples, a merged reality scene may include virtual (i.e., computer generated) scenery that is integrated with real-world objects that have been captured by physical capture devices.

Regardless of whether 3D scene 202 represents (e.g., implements, includes, etc.) a real-world scene, a virtual scene, or a merged reality scene, 3D scene 202 may include one or more objects 204 (e.g., objects 204-1 and 204-2). Depending on the type of scene represented, objects 204 may represent any real-world or virtual objects, whether living or inanimate, that are associated with 3D scene 202 (e.g., located within or around 3D scene 202) and that are detectable (e.g., viewable, etc.) from at least one view of 3D scene 202 (as will be described and illustrated below). While objects 204 are drawn as relatively simple geometric shapes for the sake of clarity, it will be understood that objects 204 may represent various types of objects having various levels of complexity. Rather than geometric shapes, for instance, either or both of objects 204 could represent animate or inanimate objects or surfaces, such as a person or another living thing, a non-transparent solid, liquid, or gas, a less discrete object such as a wall, a ceiling, a floor, or any other type of object described herein or as may serve a particular implementation.

As described above, system 100 may identify a set of experience parameters descriptive of a particular virtual reality experience included within a plurality of virtual reality experiences associated with a 3D scene. As used herein, a "virtual reality experience" may, in certain contexts, refer generally to the experiencing of a virtual reality world (e.g., a virtual representation of 3D scene 202) by a user using a media player device that presents virtual reality media content based on virtual reality data. In other contexts used herein, however (e.g., contexts specifically referring to particular virtual reality experiences included within a plurality of virtual reality experiences that are providable to users by media player devices), a "virtual reality experience" may refer to a more technical concept. Specifically, a virtual reality experience may refer to the experience that a media player device may provide a user based on a particular virtual reality dataset that, for example, includes virtual reality data that is descriptive of high levels of detail for certain aspects of a 3D scene and low levels of detail for other aspects of the 3D scene, that is encoded in a particular format, that is associated with a particular image quality and/or data rate, and so forth. In this more technical sense, a user experiencing the 3D scene may be said to "switch" or "move" from virtual reality experience to virtual reality experience as the user directs a virtual viewpoint (e.g., a vantage point by which the user looks into the 3D scene) to move from region to region within the 3D scene, as objects within the 3D scene move or change, as bandwidth capabilities of the media player device used by the user change, and so forth. As will be described below, certain virtual reality experiences (e.g., virtual reality experiences of this more technical type) may be defined by one or more "experience parameters" in a respective set of experience parameters descriptive of the respective virtual reality experience.

Figures 3A, 3B:
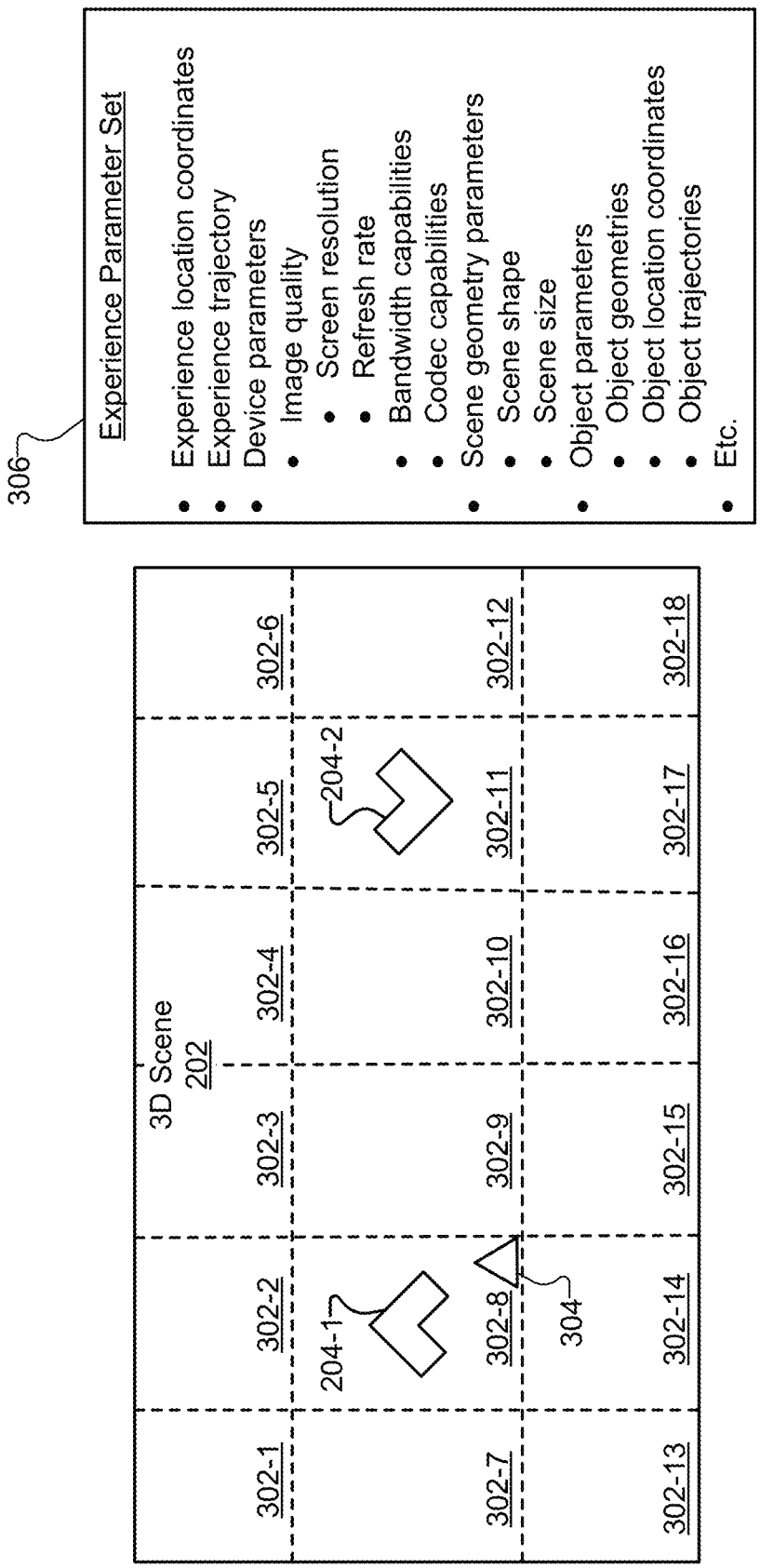
FIG. 3A illustrates a plurality of exemplary regions of the 3D scene of FIG. 2 each associated with a different virtual reality experience providable to a user according to principles described herein.
FIG. 3B illustrates an exemplary set of experience parameters descriptive of an exemplary virtual reality experience according to principles described herein.

To illustrate virtual reality experiences that may be provided to a user and the sets of experience parameters that describe the virtual reality experience, FIG. 3A and FIG. 3B show various aspects of virtual reality experiences and experience parameters in relation to 3D scene 202.

Specifically, as shown, FIG. 3A illustrates a plurality of exemplary regions 302 (e.g., regions 302-1 through 302-18) of 3D scene 202 each associated with a different virtual reality experience providable to a user. For example, region 302-1 may be associated with a first virtual reality experience, region 302-2 may be associated with a second, different virtual reality experience, and so forth. It will be understood that regions 302 illustrate only one particular aspect of a virtual reality experience (e.g., a position of a virtual viewpoint of the user within 3D scene 202), and that various other aspects may also play into the virtual reality experience. For example, a first virtual reality experience that is associated with region 302-1 may also be associated with a particular image quality (e.g., a relatively high resolution image), while a second virtual reality experience that is also associated with region 302-1 may be associated with a different image quality (e.g., a relatively low resolution image). In the same or other examples, image quality experience parameters may relate to aspects of image quality other than image resolution (i.e., pixel resolution) such as, for instance, the frame rate of the captured image, the aspect ratio of the captured image, the color resolution of the captured image, and encoding method used for the captured image, and so forth. Accordingly, the plurality of virtual reality experiences that may be providable to users may be defined by various different permutations of experience parameters including positional experience parameters (e.g., experience parameters defining the particular region 302 associated with the virtual reality experience), image quality experience parameters, and any other experience parameters as may serve a particular implementation.

As shown in FIG. 3A, a virtual viewpoint 304 of a user (i.e., a current vantage point from which the user is experiencing 3D scene 202 and which, in certain implementations, may be arbitrarily moved around 3D scene 202 at the will of the user) may be positioned within region 302-8 at a particular point in time. As shown, object 204-1 may also be located near virtual viewpoint 304 within region 302-8, while object 204-2 may be located remotely from virtual viewpoint 304 in region 302-11. As such, and as will be described in more detail below, it may be desirable for system 100 to provide to the media player device of the user a virtual reality dataset that is customized to a virtual reality experience associated with region 302-8. Such a virtual reality dataset may, for example, include a relatively high level of detail for object 204-1 (i.e., due to the relatively close proximity of object 204-1 to virtual viewpoint 304) to allow the user to experience a high-quality rendering of object 204-1, while including a lower level of detail for object 204-2 (i.e., due to the fact that object 204-2 is more remote from virtual viewpoint 304 and, thus, intricate details of object 204-2 may be unappreciable from virtual viewpoint 304).

Conversely, if virtual viewpoint 304 were to later move nearer to object 204-2 (e.g., into region 302-11), it may be desirable for system 100 to provide to the media player device a virtual reality dataset that is customized to a virtual reality experience associated with region 302-11. For example, in contrast with the virtual reality dataset described above, this virtual reality dataset may include a relatively high level of detail descriptive of object 204-2 to allow the user to experience a high-quality rendering of object 204-2, while including a lower level of detail descriptive of object 204-1.

FIG. 3B illustrates an exemplary set of experience parameters descriptive of an exemplary virtual reality experience. More specifically, an experience parameter set 306 shows various exemplary experience parameters that may be used to describe a particular virtual reality experience, such as, for instance, a virtual reality experience that may be associated with region 302-8 and provided to the media player device providing the virtual reality experience to a user who selected virtual viewpoint 304.

Experience parameter set 306 may include any types of experience parameters that may describe any aspect of the virtual reality experience as may serve a particular implementation. For example, as shown, experience parameter set 306 may include an experience parameter representative of a position within 3D scene 202 (e.g., one of regions 302) from which the virtual reality experience is provided to the user (i.e., "Experience location coordinates"). Experience parameter set 306 may also include an experience parameter representative of a trajectory of the position within 3D scene 202 (e.g., the trajectory of virtual viewpoint 304 from one region 302 to another) from which the virtual reality experience is provided to the user (i.e., "Experience trajectory"). Experience parameter set 306 may further include an experience parameter representative of a technical capability of the media player device providing the virtual reality experience to the user (i.e., "Device parameters" such as "Image quality" parameters like "Screen resolution" or "Refresh rate" supported by the media player device, "Bandwidth capabilities" supported by the media player device, "Codec capabilities" supported by the media player device, etc.). Additionally, experience parameter set 306 may include an experience parameter representative of a geometrical characteristic of 3D scene 202 associated with the virtual reality experience provided to the user (i.e., "Scene geometry parameters" such as "Scene shape," "Scene size," and the like). Moreover, experience parameter set 306 may include an experience parameter representative of a property of one or more of objects 204 included within 3D scene 202 (i.e., "Object parameters" including the "Object geometries," "Object location coordinates," "Object trajectories," etc.). Experience parameter set 306 may include any or all of these experience parameters and/or any other suitable experience parameters as may serve a particular implementation.

While experience parameter set 306 does not illustrate specific values associated with each of the different experience parameters shown therein (e.g., coordinate values, trajectory values, device parameters values, scene or object geometry descriptors, etc.), it will be understood that each experience parameter represented within experience parameter set 306 may include or be associated with any appropriate value defining the particular experience parameter as may serve a particular implementation. For example, experience location coordinate parameters may include numerical coordinate values that define a particular region of 3D scene 202 (e.g., region 302-8), experience trajectory parameters may include numerical vector values that define respective trajectories in which virtual viewpoint 304 or objects 204 may be moving, and so forth.

System 100 may identify various sets of experience parameters (i.e., including experience parameter set 306) descriptive of various virtual reality experiences that are providable to different users using different virtual viewpoints in different regions of 3D scene 202, using different media player devices with different capabilities to experience 3D scene 202, directing their virtual viewpoints on different trajectories and/or having different proximities from different objects 204 or geometrical features (e.g., corners, edges, etc.) of 3D scene 202, and so forth. Accordingly, for each identified set of experience parameters (i.e., for each providable virtual reality experience), system 100 may prepare and generate a respective virtual reality dataset that is customized to the virtual reality experience described by the set of experience parameters. System 100 may also include an entry for each of these virtual reality datasets in an experience selection data structure to facilitate the media player devices used by the different users in selecting appropriate virtual reality datasets as the users experience 3D scene 202.

In order to customize a virtual reality dataset to a particular virtual reality experience (i.e., having a particular set of experience parameters), system 100 may select a few surface data frame sequences from a larger plurality of available surface data frame sequences depicting various different views of 3D scene 202, and include the selected surface data frame sequences in a frame sequence subset upon which the customized virtual reality dataset is based. System 100 may generate and/or access the surface data frame sequences in the plurality of available surface data frame sequences depicting the different views of 3D scene 202 in any manner as may serve a particular implementation. For example, if 3D scene 202 represents a purely virtual scene with only virtual objects, the surface data frame sequences may be generated or animated (e.g., based on virtual models) by system 100 or by another system that provides data representative of the virtual scene to system 100. Conversely, if 3D scene 202 represents a real-world scene or a merged reality scene that includes at least some real-world elements (e.g., real-world objects), system 100 or a system associated with system 100 may capture the surface data frame sequences depicting the views of the real-world scene using physical, real-world capture devices.

To illustrate, FIG. 4 illustrates a plurality of views 402 (e.g., views 402-1 through 402-6) of 3D scene 202 that may be captured by different capture devices in an implementation where 3D scene 202 represents a real-world scene. Each of views 402 may represent a respective location of a capture device used to capture the real-world scene upon which 3D scene 202 is based with respect to the real-world scene. Additionally, views 402 may further represent additional aspects of how the real-world scene is captured by the respective capture devices other than the locations of the capture devices. For example, as illustrated by dotted lines emanating from each view 402, views 402 may also be associated with particular capture angles (e.g., particular directions that the capture devices corresponding to views 402 are facing), particular fields of view of capture (e.g., regions of the real-world scene represented by 3D scene 202 being captured by the capture devices based on, for example, how narrow- or wide-angle the lenses of the capture devices are, the zoom level of the capture devices, etc.), and the like. Each view 402 may further be associated with aspects of capture that are not explicitly illustrated in FIG. 4. For instance, each view 402 may be associated with a particular quality level (e.g., image resolution, frame rate, etc.) at which a surface data frame sequence is captured by a capture device associated with the view 402, a particular format with which data captured by the capture device is to be encoded, and/or any other aspects of data capture as may serve a particular implementation.

As shown, views 402 of 3D scene 202 may provide different perspectives, vantage points, etc. from which 3D scene 202 (e.g., including objects 204) may be viewed. For example, views 402 may each be fixed with respect to 3D scene 202 (e.g., the real-world scene and capture devices may be stationary or in motion together). Additionally, in some examples such as illustrated in FIG. 4, views 402 may surround 3D scene 202 along at least two dimensions (e.g., along a plane such as the ground). In certain examples, views 402 may further surround 3D scene 202 along three dimensions (e.g., by including views 402 above and below 3D scene 202 as well).

As will be further described and illustrated below, using data captured from various different views 402 (e.g., views 402 that surround the real-world scene upon which 3D scene 202 is based in order to capture the real-world scene from various perspectives), system 100 may be able to generate one or more virtualized projections of other, arbitrary views of the real-world scene. In other words, using data captured from one or more of views 402, system 100 may render virtualized projections of customized views of the real-world scene that may be associated with other locations, angles, fields of view, etc., and that may or may not align with views 402. Accordingly, as will be shown, the plurality of available surface data frame sequences from which system 100 has to select when selecting a particular frame sequence subset may include one or more virtualized surface data frame sequences that depict views of the real-world scene that are unaligned with (i.e., independent from, different from) views 402 captured by the physical capture devices.

In order to capture the real-world scene from the perspectives of each view 402, a different capture device in a plurality of capture devices may be disposed at each of the different locations of views 402. To illustrate, FIG. 5A shows an exemplary capture device 502 capturing color and depth frames from the location of view 402-1 for inclusion within a particular surface data frame sequence representative of the real-world scene upon which 3D scene 202 may be based.

Figure 5A:
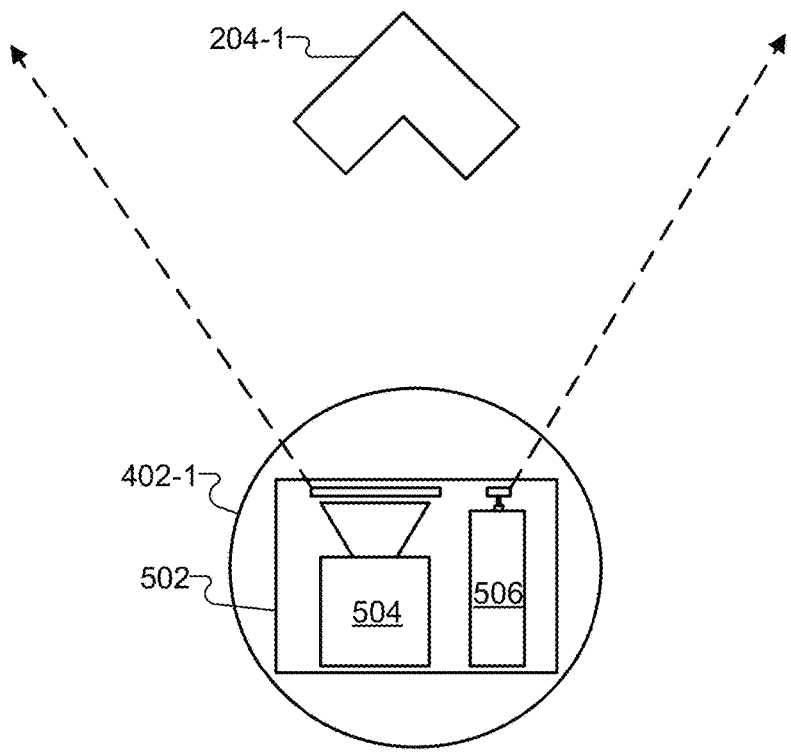
FIG. 5A illustrates an exemplary capture device capturing color and depth frames for inclusion within a surface data frame sequence representative of a real-world scene upon which the 3D scene of FIG. 2 may be based according to principles described herein.

As shown in FIG. 5A, capture device 502 may be associated with view 402-1 and, as such, may be disposed with respect to the real-world scene and real-world object 204 at the location corresponding to view 402-1. FIG. 5A illustrates that capture device 502 may include a two-dimensional ("2D") color capture device 504 configured to capture color data (e.g., 2D video data representative of full color or grayscale images) representative of the real-world scene (e.g., including real-world object 204-1 and/or other objects included therein that may be visible from the perspective of view 402-1), and a depth capture device 506 configured to capture depth data representative of the real-world scene.

2D color capture device 504 may be implemented by any suitable 2D color capture device (e.g., a camera, a video camera, etc.) and may capture 2D color data in any manner as may serve a particular implementation. In some examples, 2D color capture device 504 may be a separate device from depth capture device 506. Collectively, such separate devices (e.g., as well as any communication interfaces and/or other hardware or software mechanisms used to functionally merge the devices) may be referred to as a capture device (e.g., capture device 502). In other examples, as shown in FIG. 5A, 2D color capture device 504 and depth capture device 506 may be integrated into a single device (i.e., capture device 502) that captures both color data and depth data as will be described.

Whether implemented as a separate device or integrated with 2D color capture device 504, depth data capture device 506 may capture depth data representative of the real-world scene in any manner as may serve a particular implementation. For instance, depth data capture device 506 may employ one or more depth map capture techniques such as a structured light depth map capture technique, a stereoscopic depth map capture technique, a time-of flight depth map capture technique, another suitable depth map capture technique, or any combination of depth map capture techniques as may serve a particular implementation.

Regardless of the type and number of depth map capture techniques used to capture depth data, capture device 502 may capture both color data (e.g., color frames) and depth data (e.g., depth frames) representative of the surfaces of real-world object 204-1 and/or other objects included within the real-world scene and visible from the perspective of view 402-1. As used herein, a color frame and a depth frame that are captured at approximately the same time by capture device 502 may be collectively referred to as a "surface data frame" or a "color and depth frame" because the data included in these frames represents data describing the surfaces (i.e., both the visible appearance of the surfaces as well as the depth geometries of the surfaces) of real-world objects included in a real-world scene.

Accordingly, as used herein, a surface data frame or a color and depth frame may refer to a dataset that represents various types of data associated with surfaces of real-world objects visible within a real-world scene from a particular view of the real-world scene at a particular point in time. For example, a surface data frame may include color data (i.e., image data) as well as depth data representative of the objects as viewed from a particular view with respect to the real-world scene. As such, a plurality of related surface data frames may be sequenced together to create a video-like representation (representing not only color but also depth data) of the real-world scene as viewed from the particular view. In certain examples, a surface data frame may further be associated with other types of data such as audio data, metadata (e.g., metadata including a set of capture parameters describing the view from which the surface data frame is captured, information about specific real-world objects represented in the surface data frame, etc.), and/or other types of data as may serve a particular implementation. As will be described and illustrated below, such a sequence of surface data frames may be referred to herein as a "surface data frame sequence."

As used herein, "color data" may broadly include any image data, video data, or the like, whether represented in color or grayscale (i.e., "black and white"), that represents the appearance of a subject (e.g., a object included within a scene) at a particular point in time or over a particular time period from the perspective of a particular view. Color data is not limited to any particular format, file type, frame rate, resolution, quality level, or other characteristic that may be associated with various definitions and/or standards defining image data and/or video data in the art. Similarly, as used herein, "depth data" may include any data representative of a position and/or geometry of a subject in space. For example, depth data representative of an object may include coordinates with respect to a coordinate system (e.g., a coordinate system associated with a particular capture device, a global coordinate system associated with the 3D scene, etc.) for different points on the surfaces of the object.

As with capture device 502, which captures color and depth frames from view 402-1, it will be understood that other capture devices may be associated with other views 402 (e.g., views 402-2 through 402-6 in FIG. 4) to likewise capture color and depth frames from the respective vantage points associated with the other views 402. In some examples, surface data frames may be captured by the different capture devices associated with the different views 402 at a same particular point in time so as to be synchronous with one another. As used herein, surface data frames may be said to be captured "synchronously" or at a "same" particular point in time when the surface data frames are captured close enough in time so as to effectively represent a subject (e.g., a real-world object within a real-world scene) at a moment in time (i.e., as opposed to representing the subject over a range of time), even if the surface data frames are not captured at precisely the same instant. For instance, depending on how dynamic a particular subject is (e.g., how fast one or more real-world objects move through a real-world scene or the like), surface data frames may be considered to be captured at the same particular point in time when captured within, for example, several tens or hundreds of milliseconds of one another, or when captured within another suitable timeframe (e.g., within microseconds, milliseconds, seconds, etc.) as may serve a particular implementation. As such, each of the surface data frames may be representative of color data and depth data of surfaces of a real-world object included within the real-world scene as the surfaces appear, at the particular point in time, from the respective vantage point of the view 402 with which the respective capture device is associated.

Figure 5B:
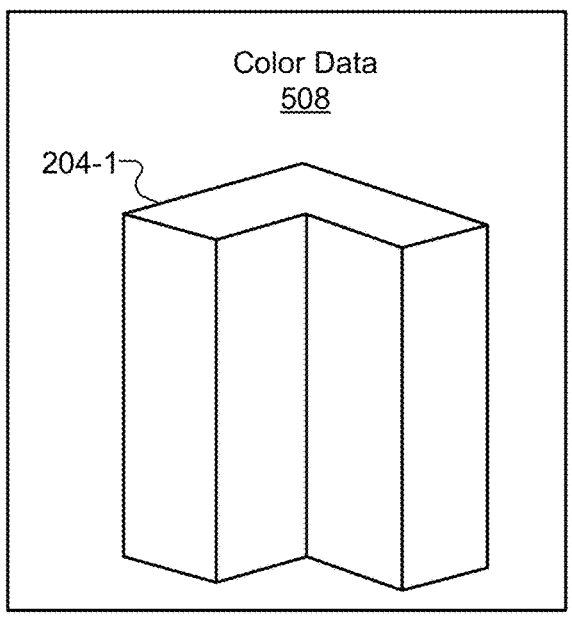
FIG. 5B illustrates an exemplary graphical depiction of color data represented in a color frame captured by the capture device of FIG. 5A according to principles described herein.
Figure 5C:
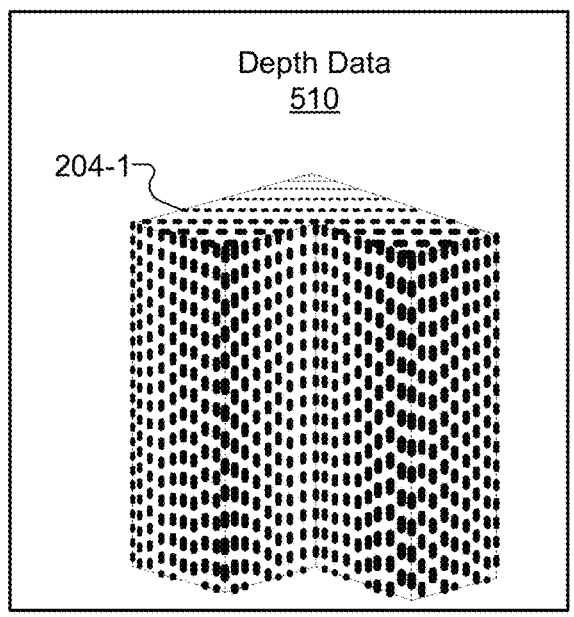
FIG. 5C illustrates an exemplary graphical depiction of depth data represented in a depth frame captured by the capture device of FIG. 5A according to principles described herein.

FIGS. 5B and 5C illustrate exemplary graphical depictions of data captured by capture device 502 and included within color and depth frames (i.e., within a surface data frame). Specifically, as shown, a color frame incorporated into the surface data frame may include color data 508 (shown in FIG. 5B), while a depth frame incorporated into the surface data frame may include depth data 510 (shown in FIG. 5C).

In FIG. 5B, color data 508 depicts the real-world scene (e.g., including object 204-1) as viewed from the perspective of view 402-1 by 2D color capture device 504 within capture device 502. Because color data 508 may represent a single video frame in a sequence of video frames, the depiction of object 204-1 represented by color data 508 may represent how object 204-1 (e.g., as well as other objects associated with the real-world scene) appeared from the vantage point of view 402-1 at a particular point in time. While illustrated as an image in FIG. 5B, it will be understood that color data 508 may be captured, encoded, formatted, transmitted, and represented in any suitable form. For example, color data 508 may be digital data that is formatted according to a standard video encoding protocol, a standard image format, or the like. In some examples, color data 508 may represent a color image (e.g., similar to a color photograph) of the objects in the real-world scene. Alternatively, in other examples, color data 508 may be a grayscale image representative of the objects (e.g., similar to a black and white photograph).

In FIG. 5C, depth data 510 also (like color data 508) depicts the real-world scene (including object 204-1) from the perspective of view 402-1. However, rather than representing the visible appearance of the objects within the real-world scene (e.g., representing in color or grayscale how light interacts with the surfaces of object 204-1), depth data 510 may represent the depth (i.e., the distance or position) of each point on the surfaces of the objects (e.g., object 204-1 as well as other objects visible from view 402-1) relative to, for example, depth capture device 506 in capture device 502. As with color data 508, depth data 510 may be captured, encoded, formatted, transmitted, and represented in any suitable form. For example, as shown, depth data 510 may be represented by grayscale image data (e.g., six or eight bits for each pixel captured by depth capture device 506). However, rather than representing how light reflects from the surfaces of object 204-1 (i.e., as represented in color data 508), the grayscale image of depth data 510 may represent, for each pixel in the image, how far away the point represented by that pixel is from depth capture device 506. For example, points that are closer to depth capture device 506 may be represented with values that represent darker shades of gray (e.g., binary values closer to 0b111111 in the case of a six-bit implementation where 0b111111 represents black). Conversely, points that are farther away from depth capture device 506 may be represented with values that represent lighter shades of gray (e.g., binary values closer to 0b000000 in the case of the six-bit implementation where 0b000000 represents white).

Figure 6A:
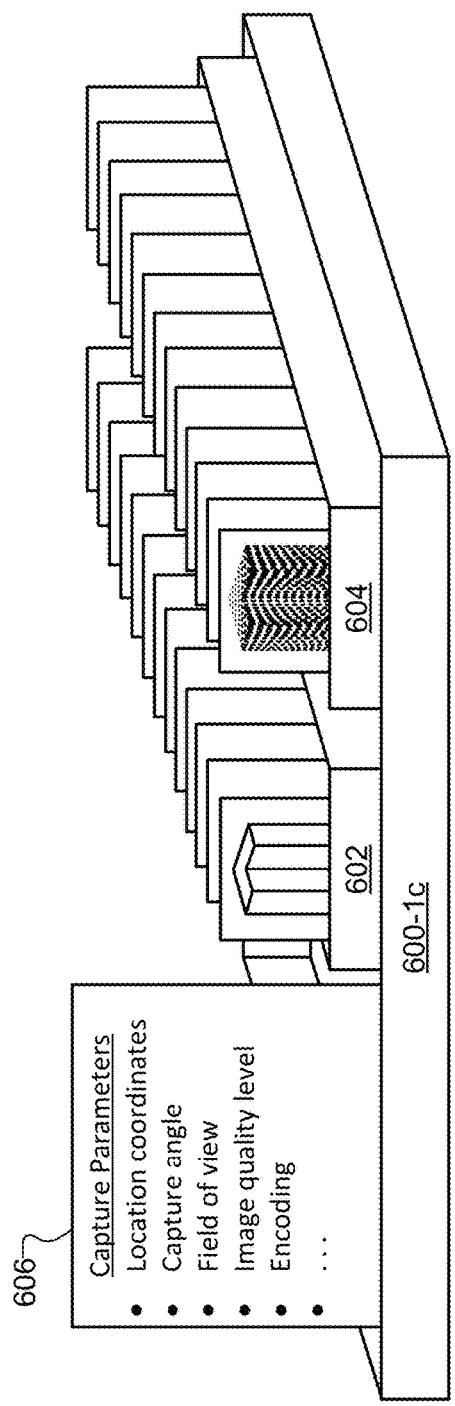
FIGS. 6A and 6B illustrate different representations of an exemplary surface data frame sequence representative of the 3D scene of FIG. 2 and generated by the capture device of FIG. 5A according to principles described herein.
Figure 6B:
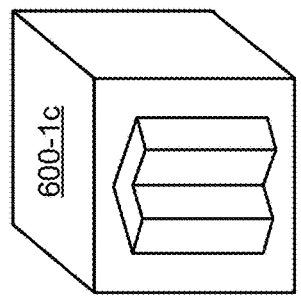

FIGS. 6A and 6B illustrate an exemplary surface data frame sequence 600-1c representative of 3D scene 202 (e.g., from the perspective of view 402-1) as generated by capture device 502. Specifically, FIG. 6A shows a detailed graphical representation of surface data frame sequence 600-1c depicting certain specific data that may be included in surface data frame sequence 600-1c, while FIG. 6B shows a consolidated graphical representation of surface data frame sequence 600-1c that does not specifically depict many details of the content of surface data frame sequence 600-1c. While surface data frame sequence 600-1c specifically depicts a surface data frame sequence captured from view 402-1 of the real-world scene upon which 3D scene 202 is based, it will be understood that other surface data frame sequences described herein (e.g., other captured surface data frame sequences as well as virtualized surface data frame sequences) may include similar components as those shown in FIG. 6A.

It will also be understood that surface data frame sequences not explicitly shown in FIG. 6, but that include similar types of data as shown for surface data frame sequence 600-1c, may also be referred to herein as surface data frame sequences 600. To this end, a notation will be used where a surface data frame sequence "600-Nc" refers to a 'c'aptured surface data frame sequence from a view 402-N, and a surface data frame sequence "600-Nv" refers to a Virtualized surface data frame sequence associated with a view 702-N (described below). As such, for example, surface data frame sequence 600-1c explicitly shown in FIG. 6A is a captured surface data frame sequence associated with (i.e., captured from) view 402-1.

As illustrated in FIG. 6A, surface data frame sequence 600-1c may include various types of data including color data, depth data, and metadata. Specifically, surface data frame sequence 600-1c is shown to include a color frame sequence 602, a depth frame sequence 604, and a set of capture parameters 606. It will be understood that surface data frame sequence 600-1c may further include other types of data (e.g., captured audio data, other metadata besides the set of capture parameters 606, etc.) not explicitly shown in FIG. 6A. Additionally, it will be understood that the data included within surface data frame sequence 600-1c may be arranged or formatted in any suitable way. For example, as shown, the data included within surface data frame sequence 600-1c may be arranged as one color frame sequence and one depth frame sequence. In other examples, a single capture device may output multiple color frame sequences and/or multiple depth frame sequences (e.g., to cover different parts of the field of view of the real-world scene being captured). In yet other examples, the data of surface data frame sequence 600-1c may be arranged as a sequence of integrated surface data frames each including a particular color frame, a particular depth frame, and certain metadata (e.g., data representative of the set of capture parameters 606) or in other ways as may serve a particular implementation.

The data included within each color frame of color frame sequence 602 may be similar to color data 508, described above in relation to FIG. 5. However, each color frame within color frame sequence 602 may be captured at slightly different times such that color frame sequence 602 may form a video-like representation of the real-world scene from view 402-1. Similarly, the data included within each depth frame of depth frame sequence 604 may be similar to depth data 510 except that each depth frame within depth frame sequence 604 may be captured at slightly different times (e.g., times synchronous with the times at which the color frames of color frame sequence 602 are captured) such that depth frame sequence 604 may form another video-like representation of the real-world scene from view 402-1.

The set of capture parameters 606 included within surface data frame sequence 600-1c may include metadata describing the view from which surface data frame sequence 600-1c is captured (i.e., in this case view 402-1). As described above, system 100 may access and use the metadata in the generation of frame sequence subsets and/or virtual reality datasets. For example, system 100 may select which surface data frame sequences are to be included in different frame sequence subsets based on the metadata, and may, in turn, generate different virtual reality datasets based on these frame sequence subsets. The metadata included in the set of capture parameters 606 may include any of various parameters indicating various aspects of where and/or how the surface data frames included within surface data frame sequence 600-1c have been captured. The capture parameters included within the set of capture parameters 606 may include any suitable capture parameters associated with the respective view of the real-world scene as may serve a particular implementation.

For example, the set of capture parameters 606 may include a capture parameter representative of a location with respect to 3D scene 202 from which color and depth frames corresponding to view 402-1 of 3D scene 202 are captured. As another example, the set of capture parameters 606 may include a capture parameter representative of an angle (e.g., a capture angle) from which the color and depth frames corresponding to view 402-1 of 3D scene 202 are captured. Similarly, as another example, the set of capture parameters 606 may include a capture parameter representative of a field of view with which the color and depth frames corresponding to view 402-1 of 3D scene 202 are captured. Additionally, as yet another example, the set of capture parameters 606 may include a capture parameter representative of an image quality with which the color and depth frames corresponding to view 402-1 of 3D scene 202 are captured. In still other examples, the set of capture parameters 606 may include any other suitable capture parameters representative of other aspects by which the color and depth frames corresponding to view 402-1 of 3D scene 202 may be captured. For instance, the set of capture parameters 606 may include parameters representative of a particular encoding, format, frame rate, or the like with which the color and depth frames corresponding to view 402-1 are captured.

The set of capture parameters 606 may be integrated with the other data included within surface data frame sequence 600-1c in any manner as may serve a particular implementation. For instance, in some examples, the set of capture parameters 606 may be integrated with (e.g., repeated for) each color frame and/or depth frame included, respectively, within color frame sequence 602 and depth frame sequence 604. In other examples, the set of capture parameters 606 may be integrated with each individual surface data frame. In these ways, the set of capture parameters 606 may flexibly describe the capture parameters for each and every frame, even if views 402 dynamically change during the time period represented by surface data frame sequence 600-1c. In other examples, the set of capture parameters 606 may be static throughout the time period represented by surface data frame sequence 600-1c. In these examples, the set of capture parameters 606 may be transmitted separately from the frames of frame sequences 602 and 604. For example, the set of capture parameters 606 may be transmitted separately from the transmission of the color and depth frames such as prior to the transmission of the color and depth frames, at the start of the transmission of the color and depth frames, after the transmission of the color and depth frames, and/or at another suitable time.

As mentioned above, FIG. 6B illustrates a consolidated graphical representation of surface data frame sequence 600-1c. Specifically, the representation of surface data frame sequence 600-1c in FIG. 6B shows surface data frame sequence 600-1c as a block with a depiction of a section of 3D scene 202 (i.e., a section including real-world object 204-1) on the front of the block as viewed from a particular view (i.e., view 402-1). This type of surface data frame sequence representation will be useful in illustrating additional surface data frame sequences in figures described below. However, it will be understood that any surface data frame sequence represented using a consolidated graphical representation such as shown in FIG. 6B may include all of the same types of data shown and/or described in connection with FIG. 6A in any of the arrangements described above.

As described above, in implementations where 3D scene 202 includes elements of a real-world scene captured by a plurality of capture devices disposed at different locations with respect to the real-world scene (e.g., locations associated with views 402 in FIG. 4), system 100 may access metadata descriptive of surface data frame sequences captured by the capture devices (e.g., such as surface data frame sequence 600-1c). Thus, based on this metadata, one or more of these captured surface data frame sequences may be included within a frame sequence subset upon which a virtual reality dataset is based. However, while the surface data frame sequences captured from views 402 may adequately cover all aspects of 3D scene 202, it may be inefficient, impractical, or otherwise undesirable for system 100 to provide a virtual reality dataset that includes all the data included in these captured surface data frame sequences. For example, the capture devices associated with each of view 402 (e.g., such as capture device 502 described above) may be configured to capture very large amounts of very detailed, high-quality data such that it may not be possible or practical for all the captured data to be provided to any particular media player device (e.g., due to network bandwidth limitations, data usage costs, media player device capabilities, etc.).

Accordingly, as mentioned above, the large amounts of data represented in the captured surface data frame sequences may be used to generate virtualized representations (e.g., one or more virtualized surface data frame sequences) of different views of 3D scene 202 which may be much more practical to provide to media player devices (e.g., by containing less redundant and/or irrelevant data). Thus, in some examples, the plurality of available surface data frame sequences (i.e., from which the surface data frame sequence included in the frame sequence subsets are selected) may include one or more virtualized surface data frame sequences that depict views of the real-world scene that are unaligned with views 402 of the real-world scene captured by the physical capture devices. Similarly, in implementations of 3D scene 202 that do not include elements of a real-world scene, all the surface data frame sequences may be virtual (i.e., based on computer-generated, virtual objects and scenery).

Figure 7:
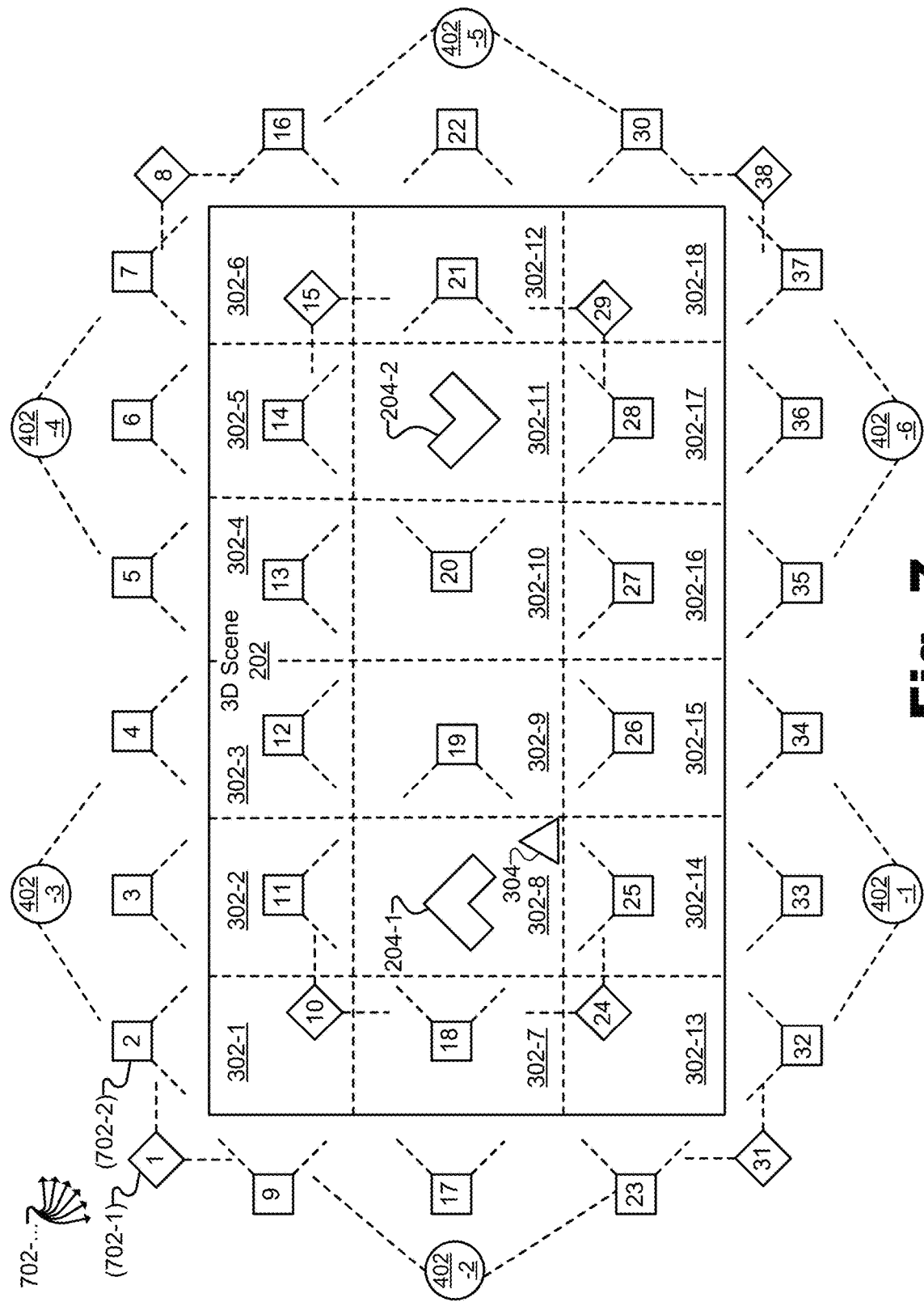
FIG. 7 illustrates a plurality of views of the 3D scene of FIG. 2 that includes the views of FIG. 4 and further includes additional exemplary views that correspond to virtualized surface data frame sequences according to principles described herein.

FIG. 7 shows a plurality of views of 3D scene 202 that includes views 402 (i.e., that correspond to captured surface data frame sequences as described above) and further includes additional exemplary views 702 (e.g., views 702-1 through 702-38) that correspond to virtualized surface data frame sequences that may be available to system 100 as system 100 customizes virtual reality data for different virtual reality experiences as described herein. For convenience, FIG. 7 further shows regions 302 of 3D scene 202 (described above in relation to FIG. 3) to help illustrate how the virtualized surface data frame sequences captured from views 702 may be customized to various virtual reality experiences associated with different regions 302.

In FIG. 7, views 702 have a similar appearance and function as views 402 described above. However, to differentiate views 402, which may be associated with physical capture devices, from views 702, which may be associated with virtualized surface data frame sequences that are generated by system 100 based on captured surface data frame sequences (i.e., as opposed to being directly captured by physical capture devices), views 402 are drawn as circles while views 702 are drawn as squares. Additionally, while each view 402 is labeled individually as such, views 702 are labeled in FIG. 7 using an abbreviated notation. Specifically, as parenthetically noted with a few of views 702 (i.e., views 702-1 and 702-2), each view 702-N is labeled only with its corresponding number ("N") and not with the "702-" root. Thus, view 702-1 is represented by a square labeled "1," view 702-2 is represented by a square labeled "2," and so forth. As used herein, a virtualized surface data frame sequence may be said to be "captured" or "virtualized" from a view 702 with which the surface data frame sequence is associated. It will be understood that, in contrast with surface data frame sequences captured by physical capture devices from views 402 (i.e., "captured surface data frame sequences"), surface data frame sequences said to be "captured" from a view 702 may not be directly captured by a physical capture device (e.g., such as capture device 502), but rather may be virtualized (e.g., rendered) based on data included within other surface data frame sequences (e.g., captured surface data frame sequences).

As with views 402, each of views 702 may be associated with a different respective set of capture parameters defining aspects of the surface data frame sequences captured from the respective views 702 such as the location, angle, field of view, image quality, etc., from which the respective surface data frame sequences are captured (i.e., virtualized). As described above, certain of the capture parameters associated with each view 702 (e.g., the capture angle and field of view parameters) may be suggested by the dotted lines emanating from each view 702. Accordingly, as made apparent by FIG. 7, when 3D scene is captured not only from views 402 by physical data capture but also captured from views 702 by virtualization, system 100 may access a relatively large plurality of surface data frame sequences from which to select frame sequence subsets customized for different virtual reality experiences.

To this end, FIG. 8 illustrates exemplary frame sequence subsets 800 (e.g., frame sequence subsets 800-1 through 800-18) upon which different virtual reality datasets corresponding to different entries in an experience selection data structure are based. As shown in FIG. 8, each frame sequence subset 800 (i.e., each row in the chart) may be associated with a particular entry number (e.g., entry numbers 1 through 18), a particular set of experience parameters (i.e., parameters summarized under the "Experience parameters" column), and a subset of surface data frame sequences (i.e., listed in the "Surface data frame sequences" column). In this example, the entries 1 through 18 correspond, respectively, with virtual reality experiences associated with regions 302-1 through 302-18 of 3D scene 202. Specifically, entry 1 may correspond to region 302-1 (listed as "Loc 1" in the experience parameter column), entry 2 may correspond to region 302-2 (listed as "Loc 2" in the experience parameter column), and so forth.

In the example of FIG. 8, most potential experience parameters (e.g., parameters associated with which device is being used to provide a virtual reality experience, parameters associated with the geometry of the scene, etc.) are constant from frame sequence subset 800 to frame sequence subset 800 (e.g., each frame sequence subset 800 includes a "std device," a "std scene," etc.). It will be understood, however, that many providable virtual reality experiences each including different sets of experience parameters with more variance may be supported in certain implementations. Additionally, it will be understood that the experience parameters shown in FIG. 8 are exemplary only and that additional or fewer experience parameters than are shown in FIG. 8 may be included in various implementations. For example, in certain implementations, surfaces within 3D scene 202 may be represented without necessarily differentiating between particular objects in the 3D scene. As such, in these implementations, an experience parameter representative of a property of an object included within 3D scene 202 may not be used.

The surface data frame sequences shown to be selected for each frame sequence subset 800 in FIG. 8 may refer to virtualized surface data frame sequences associated with views 702. Thus, for example, frame sequence subset 800-1, upon which a virtual reality dataset that is customized to a virtual reality experience associated with region 302-1 is to be based, is shown to include surface data frame sequences captured from views 702 that provide details customized to region 302-1. Specifically, frame sequence subset 800-1 includes surface data frame sequences captured from views 702-1, 702-2, 702-9, 702-10, 702-16, and 702-32. As mentioned above, these surface data frame sequences may be referred to herein as surface data frame sequences 600-1$v$, 600-2$v$, 600-9$v$, 600-10$v$, 600-16$v$, and 600-32$v$, respectively.

The surface data frame sequences 600 captured for frame sequence subset 800-1 may collectively include data upon which a virtual reality dataset customized to a virtual reality experience associated with region 302-1 may be based. For example, as a user experiences (e.g., looks at, interacts with, etc.) aspects of 3D scene 202 in and around region 302-1, high levels of detail related to these aspects may be represented by surface data frame sequences 600-1$v$, 600-2$v$, 600-9$v$, and 600-10$v$. These surface data frame sequences will also provide appropriate levels of detail as the user looks toward other regions of 3D scene 202 from region 302-1 (i.e., data representing as much detail as may be appreciable from a virtual viewpoint in region 302-1 but no more). A few surface data frame sequences that capture other angles are also included within frame sequence subset 800-1 to allow the user to look to regions outside of 3D scene 202 (e.g., toward the top of the page in the case of surface data frame sequence 600-32$v$, or to the left of the page in the case of surface data frame sequence 600-16$v$). At the same time, frame sequence subset 800-1 includes relatively little data representing high levels of detail for regions of 3D scene 202 that are remote from region 302-1. For example, surface data frame sequence 600-29$v$ (associated with view 702-29) may provide an appropriate amount of detail about object 204-2 for a virtual reality experience associated with region 302-18, and the data in surface data frame sequence 600-29$v$ may be relatively irrelevant to a virtual reality experience associated with region 302-1. Accordingly, as shown in FIG. 8, surface data frame sequence 600-29$v$ is excluded from frame sequence subset 800-1, but is included within frame sequence subset 800-18.

While only the surface data frame sequences included in frame sequence subset 800-1 have been described in detail, it will be understood that surface data frame sequences for various other frame sequence subsets 800 (i.e., frame sequence subsets 800 shown in FIG. 8 and not explicitly shown in FIG. 8) may be selected in similar ways to likewise provide virtual reality datasets customized to virtual reality experiences in other regions 302 of 3D scene 202 besides region 302-1. The surface data frame sequences shown to be selected for each frame sequence subset 800 in FIG. 8 are exemplary only. It will be understood that, in certain implementations, different numbers of surface data frame sequences may be selected for each frame sequence subset 800 depending on the nature of the virtual reality experience associated with the frame sequence subset. For example, the number of surface data frame sequences selected for a particular virtual reality experience may be determined in part by the geometry of the 3D scene such that fewer surface data frame sequences are selected for virtual reality experiences along edges and/or in corners of the 3D scene, while more surface data frame sequences are selected for virtual reality experiences in the middle of the 3D scene or where large numbers of objects are concentrated or the like.

Frame sequence subsets 800 may be generated (i.e., by selecting the surface data frame sequences for inclusion in the frame sequence subsets) and/or provided to media player devices that are providing different virtual reality experiences in any manner may serve a particular implementation. For instance, in certain implementations, a plurality of sets of experience parameters associated with a plurality of providable virtual reality experiences may be identified and predetermined prior to virtual reality datasets being provided to media player devices associated with users. In these examples, the media player devices may access the predetermined virtual reality datasets customized to the predetermined virtual reality experiences as the user moves a virtual viewpoint through 3D scene 202. Additionally or alternatively, at least some sets of experience parameters associated with certain virtual reality experiences may be identified dynamically as 3D scene 202 and objects 204 included therein dynamically change along with the virtual viewpoints of the users. In these examples, system 100 may determine (e.g., using artificial intelligence or other suitable techniques) that a surface data frame sequence associated with an additional view of 3D scene 202 should be virtualized, that an additional frame sequence subset associated with a non-predetermined virtual reality experience should be generated, or the like. In certain examples, system 100 may predictively anticipate that new surface data frame sequences or frame sequence subsets should be created prior to when they are actually needed.

As an illustration of one such dynamic implementation of system 100, frame sequence subset 800-8 is shown to be associated with a custom location (i.e., "Loc 8 (custom)," as opposed to "Loc 8," which may represent the entirety of region 302-8). This is because, with the presence of object 204-1 within region 302-8, virtual viewpoints positioned at different parts of region 302-8 may be associated with different vantage points from which different details (e.g., details on different sides of object 204-1) may be appreciable. Indeed, because object 204-1 is located within region 302-8 (and is thus very proximate to any virtual viewpoint within region 302-8), system 100 may determine that frame sequence subset 800-8 should include an additional, customized surface data frame sequence from a customized view different from any of views 402 or 702. For example, system 100 may generate a custom view at the location of virtual viewpoint 304 that is angled toward object 204-1 and include a virtualized surface data frame sequence (i.e., referred to as surface data frame sequence 600-custom) from this custom view in the surface data frame sequences selected for frame sequence subset 800-8, as shown.

Once system 100 has selected surface data frame sequences 600 for inclusion in a frame sequence subset 800 upon which a particular virtual reality dataset is to be based, system 100 may access the selected surface data frame sequences in any suitable manner. For example, system 100 (e.g., management facility 104) itself may capture and/or virtualize the surface data frame sequences, system 100 may access the surface data frame sequences directly from capture devices capturing the surface data frame sequences, system 100 may access the surface data frame sequences from a real-world scene capture system or virtual generation capture system generating virtualized or virtual surface data frame sequences, or system 100 may otherwise access the surface data frame sequences in any manner as may serve a particular implementation. After accessing the selected surface data frame sequences, system 100 (e.g., management facility 104) may generate the particular virtual reality dataset based on the accessed surface data frame sequences. For example, as will be described in more detail below, system 100 may process the surface data frame sequences to form one or more transport streams that include one or more video data streams representative of the color and depth data included within the selected surface data frame sequences.

In some examples, this process of selecting and accessing particular surface data frame sequences customized for a particular virtual reality experience and generating a particular virtual reality dataset based on the surface data frame sequences for use by a media player device providing the particular virtual reality experience may be performed for many different providable virtual reality experiences associated with a particular 3D scene. For example, system 100 may generate a customized virtual reality dataset for each virtual reality experience associated with each region 302 shown in FIGS. 3 and 7, as well as other virtual reality datasets (e.g., different virtual reality datasets for virtual reality experiences near objects 204 such as described in relation to frame sequence subset 800-8, different virtual reality datasets that vary on experience parameters other than location, etc.). As mentioned above, in some examples, many or all of these virtual reality datasets may be pre-defined and pre-generated prior to being requested by media player devices, while in other examples, some or all of these virtual reality dataset may be dynamically generated based on the needs of different media player devices as determined by system 100.

Regardless, it may be desirable for system 100 to make known information about the various virtual reality datasets available for the different virtual reality experiences to the various media player devices to which system 100 may provide virtual reality data. To this end, as described above, system 100 may generate an experience selection data structure with a plurality of entries each corresponding to a different virtual reality dataset. The experience selection data structure may be configured to facilitate dynamic selection of different entries by media player devices as the media player devices provide different virtual reality experiences to different users.

Figure 9:
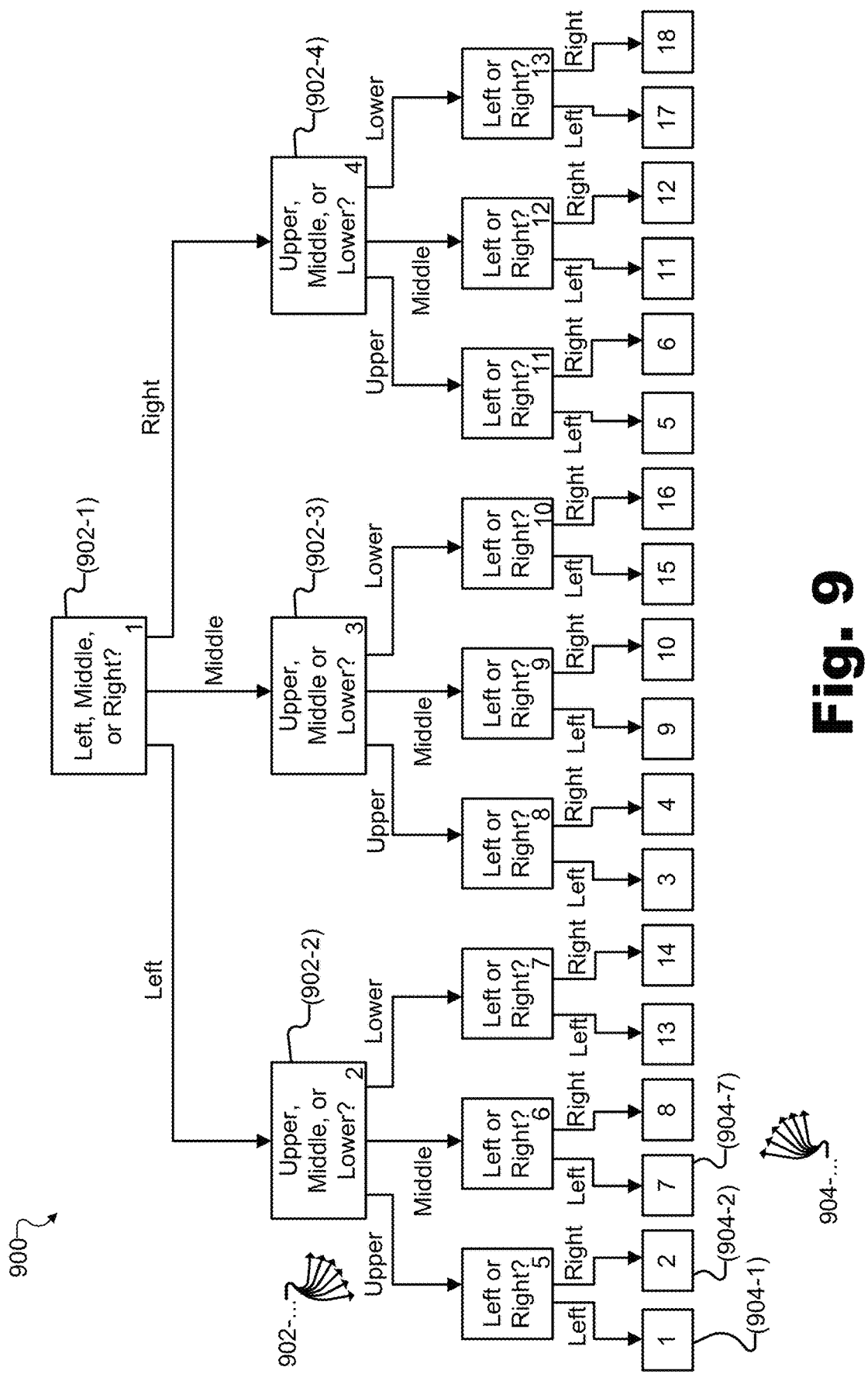
FIG. 9 illustrates an exemplary experience selection data structure configured to facilitate dynamic selection of different entries from a plurality of entries included within the experience selection data structure according to principles described herein.

To illustrate, FIG. 9 shows an exemplary experience selection data structure 900 configured to facilitate dynamic selection of different entries from a plurality of entries included within the experience selection data structure that may be generated by system 100. As shown, experience selection data structure 900 includes several levels of decision nodes 902 (e.g., nodes 902-1 in a top level, nodes 902-2 through 902-4 in a middle level, and nodes 902-5 through 902-13 in a lower level using an abbreviated labeling notation similar to the notation described above in relation to views 702 of FIG. 7) in a tree structure. At "leaf nodes" of the tree structure, experience selection data structure 900 includes a plurality of entries 904 (e.g., entries 904-1 through 904-18, labeled using a similar abbreviated notation).

Experience selection data structure 900 is shown as a spatial partitioning scheme that facilitates selection of entries based on a location (e.g., a current location of a particular virtual viewpoint of a user) within 3D scene 202. For example, a media player device associated with a user that has selected virtual viewpoint 304 within region 302-8 (and thus would ideally receive a virtual reality dataset that is customized to a virtual reality experience associated with region 302-8) may use experience selection data structure 900 as follows. First, the media player device may determine, at node 902-1, that virtual viewpoint 304 is on the left side of 3D scene 202 (i.e., rather than in the middle or on the right) and, as such, may branch to node 902-2 by following the arrow that says "Left." Next, the media player device may determine that virtual viewpoint 304 is in the middle section of the left side of 3D scene 202 (i.e., rather than in the top or bottom section) and, as such, may branch to node 902-6 by following the arrow that says "Middle." Finally, the media player device may determine that virtual viewpoint 304 is on the right-hand side of the middle section of the left side of 3D scene 202 (i.e., as opposed to the left-hand side) and, as such may branch to entry 904-8 by following the arrow that says "Right." Entry 904-8 may correspond to a virtual reality dataset that is customized to the virtual reality experience that the media player device is providing to the user (i.e., the virtual reality experience associated with virtual viewpoint 304). For example, entry 904-8 may correspond to a virtual reality dataset that is based on frame sequence subset 800-8.

As different media player devices provide different virtual reality experiences to users (e.g., as the user causes virtual viewpoint 304 to move around 3D scene 202, and as other users experiencing 3D scene 202 using other media player devices cause other respective virtual viewpoints to move around 3D scene 202), the media player devices may each select different entries 904 by way of experience selection data structure 900 in the same manner specifically described above for the selection of entry 904-8.

Experience selection data structure 900 illustrates one exemplary structure for facilitating selection of entries by media player devices. Specifically, experience selection data structure 900 employs a tree structure based on a spatial partitioning scheme to facilitate entry selection based only on the spatial positioning of virtual viewpoints. In the example of experience selection data structure 900, 3D scene 202 is divided and referenced in accordance with an orientation system based on the page on which 3D scene 202 is drawn (i.e., referring to portions of 3D scene 202 by descriptors such as "left," "right," "upper," and "lower"). However, it will be understood that a 3D scene may be divided and referenced in accordance with any suitable orientation system and using any suitable descriptors as may serve a particular implementation (e.g., numerical descriptors, cartesian coordinate descriptors, etc.).

Additionally, it will be understood that while the example of FIG. 9 shows the plane of 3D scene 202 being divided in thirds, efficient selection algorithms may be used in certain implementations that require 3D scene 202 to be divided into portions divisible by 2. For example, tree structures implementing experience selection data structures similar to experience selection data structure 900 may be implemented using binary space partitioning trees, octrees, k-dimensional trees, and/or any other suitable structures as may serve a particular implementation. Moreover, while all the entries 904 are illustrated as being at the same depth level within the tree structure of experience selection data structure 900, it will be understood that entries 904 may be at any depth level within experience selection data structure 900 and may be at different depth levels as may serve a particular implementation. For example, entries 904 with lower depth levels (i.e., under fewer nodes 902) may cover larger areas of the 3D scene, while entries 904 with higher depth levels (i.e., under more nodes 902) may cover smaller areas of the 3D scene. In certain examples, experience selection data structures based on other structures and/or schemes other than tree structures and spatial partitioning schemes may similarly be used as may serve a particular implementation.

Once a media player device has selected an entry by way of experience selection data structure 900 (e.g., entry 904-8, as described above), system 100 may detect that the media player device has selected the entry and may provide a particular virtual reality dataset corresponding to the selected entry to the media player device in any suitable way. For example, the selected entry corresponding to the particular virtual reality dataset may include a datalink allowing access by the media player device to the particular virtual reality dataset. As such, system 100 may receive (e.g., from the media player device) a request based on the datalink included within the selected entry (e.g., entry 904-8) to access the particular virtual reality dataset that is customized to the particular virtual reality experience (e.g., a virtual reality dataset that is customized to the custom virtual reality experience associated with region 302-8 and that is based on frame sequence subset 800-8). In response to receiving the request, system 100 may provide, to the media player device, the particular virtual reality dataset that is customized to the particular virtual reality experience.

In some implementations, experience selection data structure 900 may be relatively static in the sense that most or all of entries 904 are determined at one point in time (e.g., based on spatial partitioning, based on artificial intelligence, based on another suitable technique, etc.) then virtual reality datasets for each entry 904 are maintained to be ready for streaming to a media player device that requests a particular entry 904. Additionally, as mentioned above, in certain examples, the selecting of the surface data frame sequences for inclusion in the frame sequence subsets (e.g., frame sequence subsets 800) upon which different virtual reality datasets are based may be performed dynamically. As such, in these examples, experience selection data structure 900 may similarly be a dynamic experience selection data structure. For instance, entries 904 included within dynamic experience selection data structure 900 may change (e.g., entries may be added or removed, datalinks included within entries may change to link to different virtual reality datasets, etc.) in response to events occurring with respect to 3D scene 202.

Experience selection data structure 900 may be encoded, represented in data, and provided (i.e., transmitted) in any way as may serve a particular implementation. For example, if experience selection data structure 900 is dynamically changing, it may be desirable for experience selection data structure 900 to be included as part of the virtual reality datasets that are provided to the media player devices (e.g., included within the transport streams by which the virtual reality datasets may be distributed) such that the media player devices constantly receive updated copies of experience selection data structure 900. In other examples, experience selection data structure 900 may be transmitted to media player devices separately from virtual reality datasets or may be made available for access to media player devices in other suitable ways.

Additionally, experience selection data structure 900 may be provided to and used by any suitable system or device. For example, while the description above has largely focused on the use of experience selection data structure 900 by client-side media player devices, it will be understood that, in certain implementations, experience selection data structure 900 may be provided to and used by server-side systems and/or processes. As one example, system 100 may provide experience selection data structure 900 to a virtual reality dataset multiplexing system downstream from system 100 (i.e., in a subsequent processing stage) within a virtual reality data provider pipeline in which virtual reality data is progressively processed in a sequence of processing stages. The virtual reality dataset multiplexing system may be communicatively coupled with system 100 and may be configured to dynamically provide (e.g., to one or more media player devices downstream from the virtual reality dataset multiplexing system) one or more of the different virtual reality datasets customized to the different virtual reality experiences. For instance, the virtual reality dataset multiplexing system may provide the virtual reality datasets based on dynamic data received from the media player devices representative of current virtual reality experiences the media player devices are respectively providing to respective users.

Figure 10:
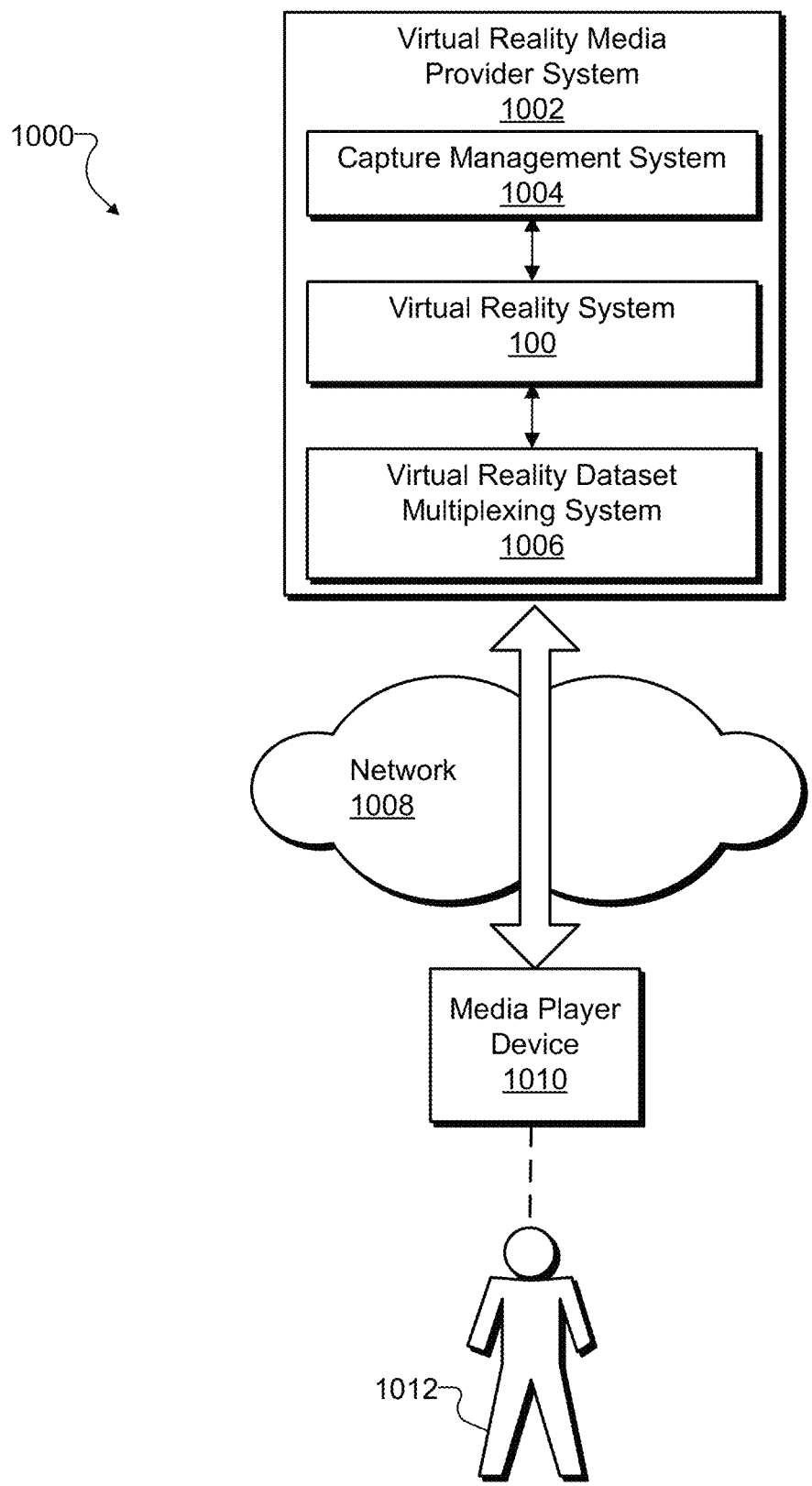
FIGS. 10 and 11 illustrate exemplary configurations in which exemplary virtual reality media provider systems customize virtual reality data according to principles described herein.

To illustrate, FIG. 10 shows an exemplary configuration 1000 in which an exemplary virtual reality media provider system customizes virtual reality data for different virtual reality experiences by using a virtual reality dataset multiplexing system. Specifically, as shown in FIG. 10, a server-side virtual reality media provider system 1002 ("provider system 1002") includes a capture management system 1004, an implementation of system 100, and a virtual reality dataset multiplexing system 1006 ("multiplexing system 1006") operatively and communicatively coupled together. Provider system 1002 may provide (e.g., transmit, stream, etc.) virtual reality data (e.g., particular virtual reality datasets) by way of a network 1008 to one or more client-side media player devices including a media player device 1010 used by a user 1012.

Within provider system 1002, system 100 may interoperate with capture management system 1004 to access the metadata descriptive of the plurality of surface data frame sequences that may be available to be included in different frame sequence subsets, to identify different sets of experience parameters descriptive of different virtual reality experiences providable to users, to access the surface data frame sequences such that the surface data frame sequences can be packaged up into virtual reality datasets, and so forth. To this end, capture management system 1004 may generate and provide to system 100 surface data frame sequences (including metadata descriptive of the surface data frame sequences) including captured surface data frame sequences (i.e., surface data frame sequences captured by physical capture devices from different views of a real-world scene), virtualized surface data frame sequences (i.e., surface data frame sequences corresponding to custom views of the real-world scene and virtualized based on the captured surface data frame sequences), virtual surface data frame sequences (i.e., surface data frame sequences representative of virtual scenes or virtual elements of merged reality scenes), and so forth.

Subsequently, once system 100 has analyzed and selected surface data frame sequences for various frame sequence subsets 800 and generated experience selection data structure 900, system 100 may provide experience selection data structure 900 to multiplexing system 1006. Multiplexing system 1006 may be included within certain implementations of system 100 or, as illustrated in configuration 1000, may act as intermediary between system 100 and media player device 1010. In either situation, multiplexing system 1006 may receive both experience selection data structure 900 (i.e., from system 100) and dynamic data representative of the current virtual reality experience being provided (i.e., from media player device 1010), and may act as an intermediary to help provide, as efficiently as possible, the most relevant virtual reality data possible to media player device 1010. To this end, multiplexing system 1006 may include artificial intelligence configured to monitor and track the movements of user 1012 and usage of virtual reality data that has already been provided to media player device 1010 to try to determine patterns, to anticipate what data media player device 1010 will require before media player device 1010 requests the data, and to otherwise intelligently provide relevant, efficient, highly customized data to media player device 1010.

As one example, multiplexing system 1006 may determine that multiple virtual reality datasets (i.e., corresponding to multiple entries 904 in experience selection data structure 900) should be transmitted to media player device 1010 in anticipation of an action that the user may be likely to take or an event that is likely to occur in 3D scene 202. For instance, one provided virtual reality dataset may be used currently, while another virtual reality dataset may be buffered and prepared for anticipated use in a short period of time. As another example, multiplexing system 1006 may help ensure that each frame sequence subset represented in and included within experience selection data structure 900 and/or that is provided to media player device 1010 is a robust and full-featured frame sequence subset such that media player device 1010 will be able to present virtual reality media content to user 1012 based on the surface data frame sequences in the frame sequence subset regardless of how user 1012 behaves. For instance, multiplexing system 1006 may ensure that any virtual reality dataset provided to media player device 1010 will allow user 1012 to look in any direction without seeing a black screen or a low-quality image.

Network 1008 may include a provider-specific wired or wireless network (e.g., a cable or satellite carrier network or a mobile telephone network), the Internet, a wide area network, a content delivery network, or any other suitable network. Data may flow between provider system 1008 and media player device 1010 (as well as other media player devices not explicitly shown) using any communication technologies, devices, media, and protocols as may serve a particular implementation.

Media player device 1010 may be used by user 1012 to access and experience virtual reality media content provided by provider system 1002. For example, media player device 1010 may be configured to generate a 3D representation of 3D scene 202 to be experienced by user 1012 from an arbitrary virtual viewpoint (e.g., a dynamically selectable virtual viewpoint selected by the user and corresponding to an arbitrary virtual location within 3D scene 202). To this end, media player device 1010 may include or be implemented by any device capable of presenting a field of view of 3D scene 202 and detecting user input from user 1012 to dynamically update the part of 3D scene 202 presented within the field of view as user 1012 experiences a virtual representation of 3D scene 202. Specific examples of types of media player devices will be further described below.

Configuration 1000 illustrates a somewhat general configuration in which system 100 may interoperate with other systems and devices to customize virtual reality data. However, it will be understood that, in certain implementations, system 100 and the configuration in which it is used may be configured to operate in accordance with particular system requirements. In particular, certain configurations of system 100 may be used to customize virtual reality data derived from an arbitrarily large collection of data and/or to provide the customized virtual reality data to an arbitrarily large number of different media player devices. As a consequence, the amount of data processed by system 100 in certain examples may be extremely large and may therefore require massive computing power (e.g., computing power from many servers networked and interoperating together) to perform the functionality described herein. This is particularly true for implementations of system 100 (e.g., and implementations of provider system 1002) that provide virtual reality data in real time (e.g., as events occur within a real-world scene) to many different media player devices.

FIGS. 11 through 14 illustrate particular aspects of system 100 that may facilitate system 100 in scaling up to handle virtual reality data customization as described herein for 3D scenes of arbitrary size, for arbitrary numbers of available surface data frame sequences, for arbitrary levels of detail and/or picture quality, and the like. Specifically, by implementing system 100 according to the principles described below, methods and systems described herein may be performed and implemented in very flexible and scalable ways that may provide various advantages to providers and users of virtual reality content alike. For example, providers may expand system 100 to meet virtually any system requirements by adding more hardware (e.g., additional servers, additional processors, etc.) to system 100, while users may experience large and interesting 3D scenes with vivid levels of detail and without inordinate data usage.

Figure 11:
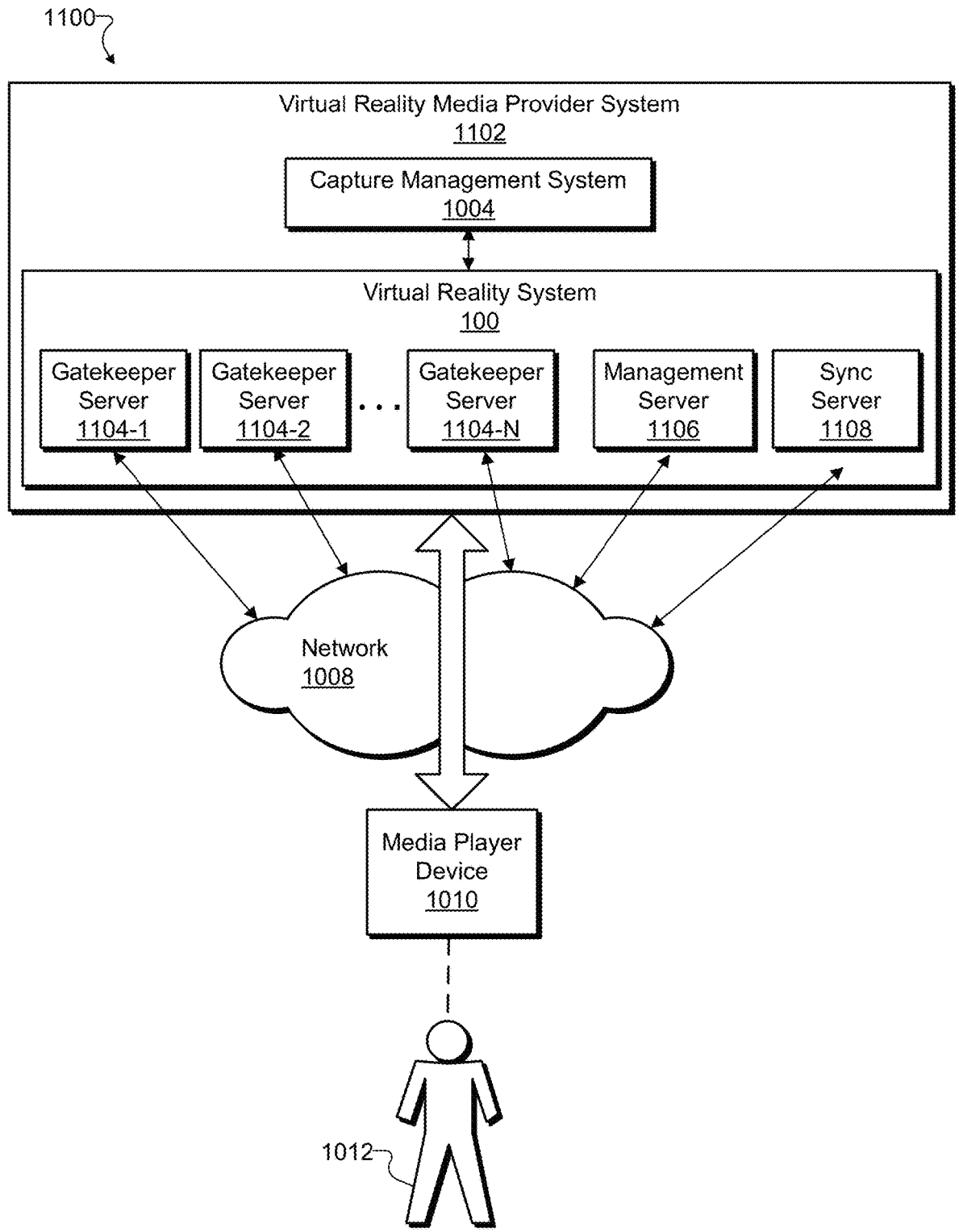

FIG. 11 illustrates an exemplary configuration 1100 in which another exemplary virtual reality media provider system customizes virtual reality data. Configuration 1100 has certain similarities with configuration 1000 described above. For example, configuration 1100, like configuration 1000, includes a virtual reality media provider system (in this case, a virtual reality media provider system 1102

("provider system 1102")) that includes capture management system 1004 (described above) and an implementation of system 100. Additionally, configuration 1100 includes network 1008 and media player device 1010 associated with user 1012 (as further described above). While configuration 1100 does not show any additional elements of provider system 1102 (e.g., such as multiplexing system 1006 and/or other systems included within a virtual reality media provider pipeline implemented by provider system 1102), it will be understood that, in certain implementations, multiplexing system 1006 and/or other suitable elements may also be present in configuration 1100 as may serve a particular implementation.

The primary distinction between provider system 1102 and provider system 1002 described above is that provider system 1102 includes an implementation of system 100 that more explicitly illustrates how different computing resources (e.g., different servers that may be straightforward to add to or remove from system 100 as processing requirements of system 100 vary from implementation to implementation) may interoperate to perform the functionality of system 100 described herein. Specifically, as shown in FIG. 11, system 100 may include a plurality of gatekeeper servers 1104 (e.g., gatekeeper servers 1104-1 through 1104-N), one or more management servers 1106 (only one pictured in FIG. 11), and a synchronization server 1108. Servers 1104 through 1108 may represent any type of discrete computing resources as may serve a particular implementation. For example, each of servers 1104 through 1108 may be implemented by separate computers (e.g., separate server computers), by separate blades within a blade server, by separate processors associated with a single computer, and/or by any other types of discrete computing resources. In certain implementations, certain servers represented by servers 1104 through 1108 may also be combined on a single computing resource. For instance, system 100 may include a plurality of gatekeeper servers and one additional server that performs functionality of both management server 1106 and synchronization server 1108.

Each of gatekeeper servers 1104 may be responsible for processing one or more surface data frame sequences (e.g., received from capture management system 1004). For instance, if the surface data frame sequences include relatively high levels of detail and large amounts of data, each gatekeeper server 1104 may be responsible for fewer surface data frame sequences (as few as one surface data frame sequence if that is all that each gatekeeper server is capable of handling). Conversely, if the surface data frame sequences include lower levels of detail and/or smaller amounts of data (e.g., or if gatekeeper servers 1104 include relatively powerful computing resources), each gatekeeper server 1104 may be responsible for several surface data frame sequences or, in some embodiments, a single gatekeeper server 1104 may be responsible for all the available surface data frame sequences if the gatekeeper server 1104 is capable of handling them all.

In operation, a first gatekeeper server may access a first surface data frame sequence that includes color and depth frames depicting a particular view of a 3D scene, while a second gatekeeper server may access a second surface data frame sequence that includes color and depth frames depicting a different view of the 3D scene. For example, referring to the example of frame sequence subset 800-8 described above, gatekeeper server 1104-1 may access certain surface data frame sequences selected for inclusion in frame sequence subset 800-8, such as surface data frame sequences 600-10v, 600-11v, and 600-18v (i.e., the surface data frame sequence associated with views 702-10, 702-11, and 702-18, respectively). Meanwhile, a separate gatekeeper server, gatekeeper server 1104-2, may access other surface data frame sequences selected for inclusion in frame sequence subset 800-8, such as surface data frame sequences 600-19v, 600-24v, 600-25v, and 600-custom (i.e., the surface data frame sequences associated with views 702-19, 702-24, 702-25, and the custom view associated with virtual viewpoint 304, respectively).

The first gatekeeper server (i.e., gatekeeper server 1104-1 in this example) may transmit, to management server 1106 (e.g., by way of network 1008 or other suitable communication connection) and in response to a request sent from management server 1106 (described below), color and depth frames included within the surface data frame sequences that the first gatekeeper server is responsible for (i.e., surface data frame sequences 600-10v, 600-11v, and 600-18v) by way of respective individual transport streams. Synchronously with the transmitting by the first gatekeeper server, the second gatekeeper server (i.e., gatekeeper server 1104-2 in this example) may similarly transmit, to management server 1106 (e.g., by way of network 1108 or other suitable communication connection) and in response to the request, color and depth frames included within the second surface data frame sequences that the second gatekeeper server is responsible for (i.e., surface data frame sequences 600-19v, 600-24v, 600-25v, and 600-custom) by way of other respective individual transport streams.

Figure 12:
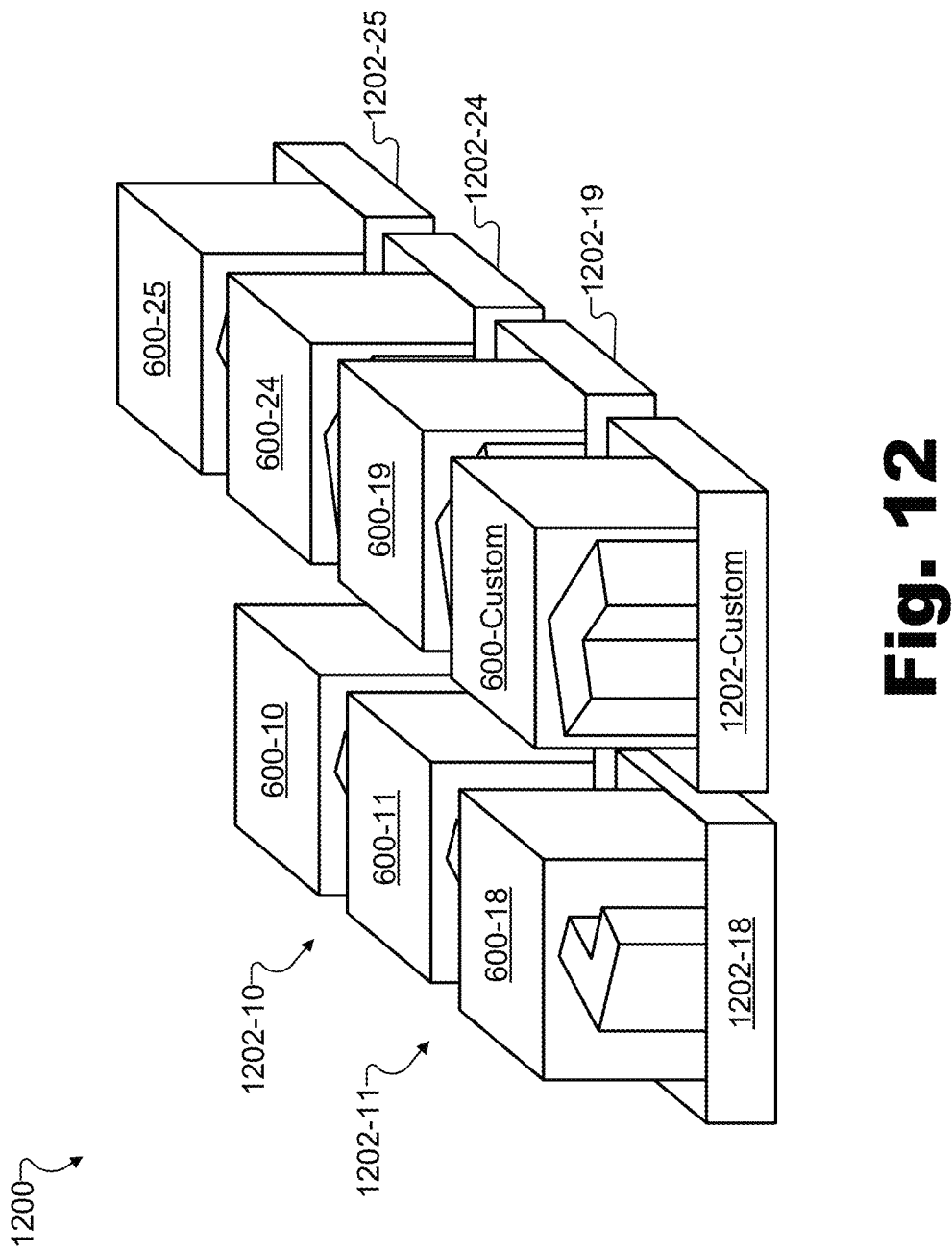
FIG. 12 illustrates surface data frame sequences transmitted by way of individual transport streams according to principles described herein.

To illustrate, FIG. 12 shows surface data frame sequences transmitted by way of individual transport streams. Specifically, as shown, the surface data frame sequences 600 that, as described above, were selected for frame sequence subset 800-8 (i.e., surface data frame sequences 600-10v, 600-11v, 600-18v, 600-19v, 600-24v, 600-25v, 600-custom) are each transmitted within an individual transport stream 1202 (i.e., transport streams 1202-10, 1202-11, 1202-18, 1202-19, 1202-24, 1202-25, and 1202-custom, respectively).

As used herein, "transport streams" may refer to data structures used to package data for purposes of facilitating transmission (i.e., transport) of the data from one device or system to another, rendering or otherwise processing or analyzing the data, and/or for other purposes as may serve a particular implementation. In some examples, a transport stream may incorporate one or more data streams (e.g., one or more video data streams) and/or other data such as metadata or the like. Transport streams may be implemented as any type of transport stream that may serve a particular implementation. For example, certain transport streams described herein (e.g., transport stream 1202) may be implemented as an MPEG transport stream, an MPEG-2 transport stream, or another suitable data structure that facilitates the transport of data such as surface data frame sequences, video data streams, and the like.

Returning to FIG. 11, gatekeeper servers 1104 may interoperate with management server 1106 and/or synchronization server 1108 to synchronously send individual frames (e.g., color and depth frames) of respective surface data frame sequences to management server 1106, which may subsequently generate virtual reality datasets configured for transmission to media player device 1010. For example, continuing with the example above, management server 1106 may select the surface data frame sequences 600 shown in FIG. 12 for inclusion in frame sequence subset 800-8. Management server 1106 may then send the request (i.e., the request mentioned above in response to which gatekeeper servers 1104-1 and 1104-2 synchronously transmitted their respective color and depth frames) to gatekeeper servers 1104-1 and 1104-2. In response, management server 1106 may receive (e.g., from gatekeeper server 1104-1 by way of network 1008) the color and depth frames included within the surface data frame sequences for which gatekeeper 1104-1 is responsible (e.g., by way of individual transport streams). Similarly, and synchronously with the receiving of the color and depth frames from gatekeeper server 1104-1, management server 1106 may receive (e.g., from gatekeeper server 1104-2 by way of network 1008) the color and depth frames included within the surface data frame sequences for which gatekeeper 1104-2 is responsible (e.g., by way of additional individual transport streams).

The synchronous transmitting of the color and depth frames included within different surface data frame sequences by way of different individual transport streams may be performed in any manner as may serve a particular implementation. For instance, in certain implementations, gatekeeper servers 1104 and/or management server 1106 may communicate and/or otherwise interoperate with synchronization server 1108 to facilitate the synchronous transmission of the color and depth frames from gatekeeper servers 1104 to management server 1106.

Specifically, continuing the example described above with respect to frame sequence subset 800-8, gatekeeper server 1104-1 may transmit, to synchronization server 1108, data indicating that a first color and depth frame included within one of the surface data frame sequences has been received by gatekeeper server 1104-1 (e.g., a color and depth frame included within, for example, surface data frame sequence 600-10v). Gatekeeper server 1104-2 may similarly transmit, to synchronization server 1108, data indicating that a second color and depth frame included within one of the surface data frame sequences has been received by gatekeeper server 1104-2 (e.g., a color and depth frame included within, for example, surface data frame sequence 600-19v and that corresponds to the first color and depth frame). In response to the transmitting of the data indicating that the first and second color and depth frames have been received, gatekeeper servers 1104-1 and 1104-2 may receive, from synchronization server 1108, data indicating a designated timeframe within which the first and second color and depth frames are to be synchronously transmitted, and gatekeeper servers 1104-1 and 1104-2 may transmit the first and second color and depth frames (along with other color and depth frames from other surface data frame sequences included in frame sequence subset 800-8) to management server 1106 within the designated timeframe.

Figure 13:
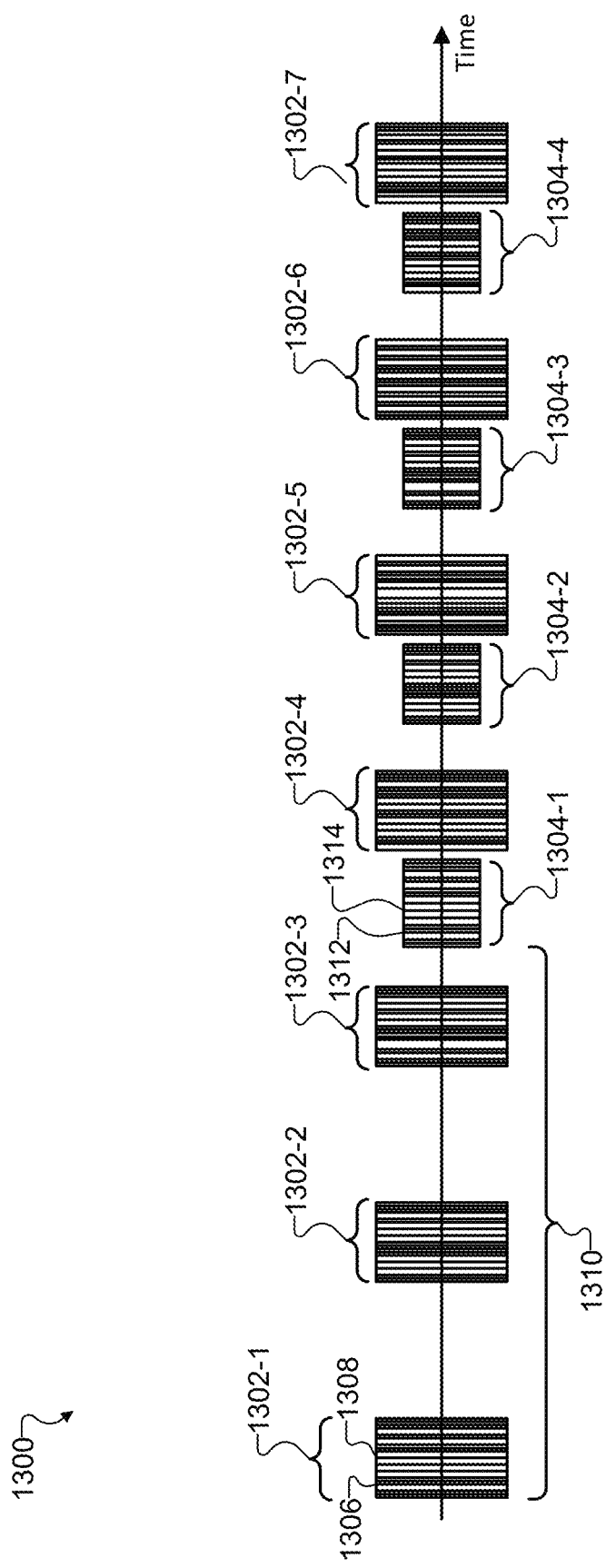
FIG. 13 illustrates an exemplary timeline depicting timeframes within which color and depth frames are received by gatekeeper servers and timeframes designated for the color and depth frames to be synchronously transmitted by the gatekeeper servers according to principles described herein.

To illustrate, FIG. 13 shows an exemplary timeline 1300 depicting timeframes 1302 (e.g., timeframes 1302-1 through 1302-7) within which color and depth frames may be received by gatekeeper servers 1104, and timeframes 1304 (e.g., timeframes 1304-1 through 1304-4) designated for the color and depth frames to be synchronously transmitted by gatekeeper servers 1104, as described above. Specifically, each vertical line drawn within each timeframe 1302 may mark a moment in time when a particular gatekeeper server 1104 received a particular color and depth frame of a particular surface data frame sequence that the gatekeeper server is responsible for. For example, a vertical line 1306 within timeframe 1302-1 may mark the moment when gatekeeper server 1104-1 received the first color and depth frame included within surface data frame sequence 600-10v, while another vertical line 1308 within timeframe 1302-1 may mark the moment (relatively proximate to the moment when the first color and depth frame was received) when gatekeeper server 1104-2 received the second color and depth frame included within surface data frame sequence 600-19v. In like manner, the other vertical lines included within timeframe 1302-1 may mark other moments when gatekeeper servers 1104 (e.g., gatekeeper servers 1104-1, 1104-2, or other gatekeeper servers 1104) receive other color and depth frames included within other surface data frame sequences (e.g., other surface data frame sequences included within frame sequence subset 800-8 or surface data frame sequences used in other frame sequence subsets 800).

A delay 1310 of arbitrary length (e.g., a few milliseconds, a few seconds, a few minutes, etc.) may be included before gatekeeper servers 1104 begin transmitting the color and depth frames received in any particular timeframe 1302. However, once all of the corresponding color and depth frames have been received for all the surface data frame sequences by all the gatekeeper servers 1104, synchronization server 1108 may designate (e.g., schedule) a timeframe 1304 during which the color and depth frames are to be transmitted. For example, for all the color and depth frames received during timeframe 1302-1, synchronization server 1108 may designate timeframe 1304-1 (i.e., after delay 1310) during which each respective gatekeeper server 1104 is to transmit color and depth frames for any surface data frame sequence that has been requested (e.g., all the surface data frame sequences that are included in at least one frame sequence subset 800).

Thus, for example, if management server 1106 has requested the surface data frame sequences included within frame sequence subset 800-8 from gatekeeper servers 1104-1 and 1104-2 as described above, each of the color and depth frames received during timeframe 1302-1 and associated with these surface data frame sequences may be synchronously transmitted to management server 1106 during timeframe 1304-1. Specifically, for instance, the first color and depth frame (i.e., from surface data frame sequence 600-10v) may be transmitted at a time marked by a vertical line 1312, while the second color and depth frame (i.e., from surface data frame sequence 600-19v) may be transmitted at a time marked by a vertical line 1314.

The color and depth frames may be transmitted by gatekeeper servers 1104 to management server 1106 in any suitable way. For example, in certain implementations, during each timeframe 1304, all of the gatekeeper servers 1104 responsible for a surface data frame sequence that has been requested by management server 1106 may transmit a particular color and depth frame from the requested surface data frame sequence by way of a point-to-multipoint protocol (e.g., using user datagram protocol ("UDP") or the like) so that management server 1106 may receive the particular color and depth frames that it has requested. In this way, a plurality of management servers 1106 (not explicitly shown in FIG. 11) that may be operating in parallel with one another to prepare and package a plurality of different virtual reality datasets may request and receive color and depth frames upon which their respective virtual reality datasets are based while ignoring other color and depth frames. Accordingly, with a sufficient number of gatekeeper servers 1104 and management servers 1106, an arbitrary number of surface data frame sequences can be recombined into an arbitrary number of frame sequence subsets upon which an arbitrary number of virtual reality datasets are based.

Upon receiving the synchronous transmissions including the color and depth frames for the selected surface data frame sequences, management server 1106 may package the color and depth frames synchronously received from gatekeeper servers 1104 to form an additional transport stream (e.g., a separate transport stream from those used by gatekeeper servers 1104 to transmit frames to management server 1106) that includes video data streams corresponding to the surface data frame sequences selected for inclusion in frame sequence subset 800-8. Specifically, the additional transport stream may include a color video data stream and a depth video data stream associated with each of surface data frame sequences 600-10v, 600-11v, 600-18v, 600-19v, 600-24v, 600-25v, and 600-custom.

In some examples, the additional transport stream may be configured for streaming to the media player device. As such, the additional transport stream including these video data streams may implement the virtual reality dataset that is customized to the virtual reality experience associated with frame sequence subset 800-8. Put another way, the virtual reality dataset that is customized to the virtual reality experience associated with frame sequence subset 800-8 (i.e., and associated with virtual viewpoint 304) may include or be implemented by this additional transport stream.

Figure 14:
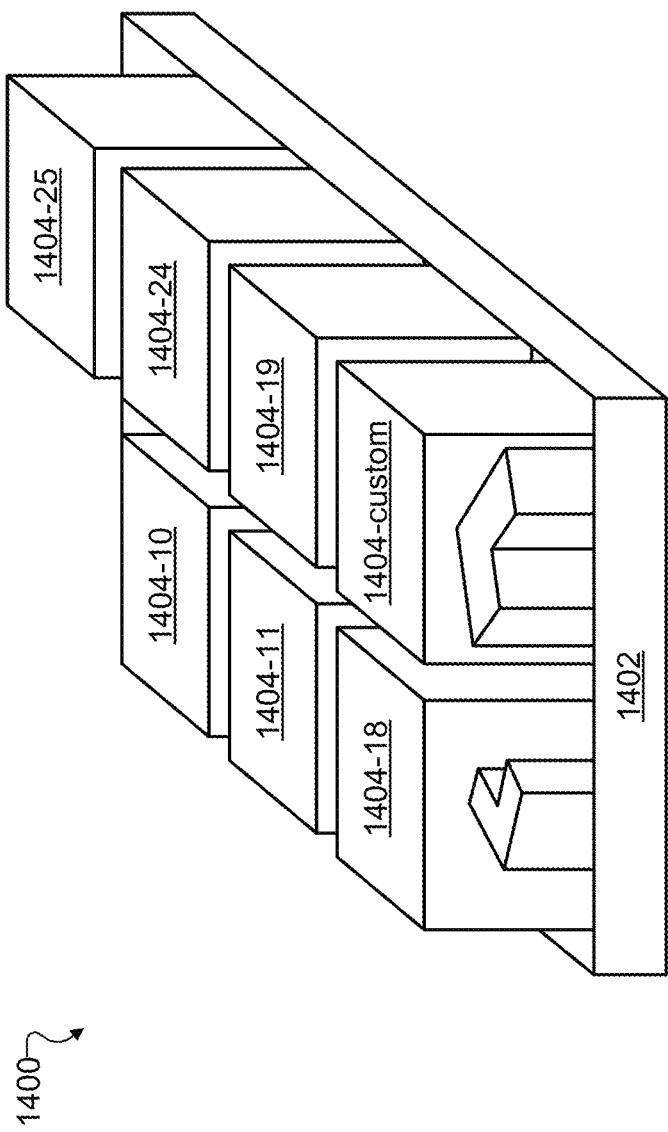
FIG. 14 illustrates an exemplary virtual reality dataset implemented as a transport stream that includes a plurality of video data streams and that is configured for streaming to a media player device according to principles described herein.

To illustrate, FIG. 14 shows an exemplary virtual reality dataset 1400 implemented as (e.g., packaged as) a transport stream 1402 that includes a plurality of video data streams 1404 (i.e., video data streams 1404-10, 1404-11, 1404-18, 1404-19, 1404-24, 1404-25, and 1404-custom). Transport stream 1402 may be configured for streaming to media player device 1010 by way of network 1008 and, as such, may be associated with (e.g., represented by a datalink included within) entry 904-8 of experience selection data structure 900.

Virtual reality dataset 1400 may be generated in any suitable way. For example, system 100 may access the surface data frame sequences 600 selected for inclusion in frame sequence subset 800-8 and may generate virtual reality dataset 1400 based on the accessed surface data frame sequences. More particularly, system 100 may generate virtual reality dataset 1400 by generating a plurality of video data streams each associated with a different accessed surface data frame sequence (e.g., encoding each surface data frame sequence into a color video data stream and a depth video data stream), and by then generating transport stream 1402 to include the plurality of video data streams. In certain examples, the encoding of each surface data frame sequence into a color video data stream and a depth video data stream may be performed previously (e.g., by capture management system 1004, by gatekeeper servers 1104, or elsewhere within system 100 or provider system 1102). For instance, the surface data frame sequences 600 transmitted by gatekeeper servers 1104 may have already been encoded into video data streams 1404.

As mentioned above, virtual reality datasets such as virtual reality dataset 1400 may be generated dynamically (e.g., generated "on demand" and/or "to order" based on what media player device 1010 requests or is determined to be in need of) or may be pre-packaged ahead of time based on virtual reality experiences that system 100 determines to be providable. Additionally, while transport stream 1402 illustrates one exemplary manner in which virtual reality dataset 1400 may be packaged, it will be understood that virtual reality dataset 1400 may be packaged in various other suitable manners as may serve a particular implementation. For instance, in certain examples, virtual reality dataset 1400 may be transmitted as part of more than one transport stream or may use a texture atlas technique or other data packaging or data transporting techniques and/or protocols that may facilitate the efficient and effective providing of the data in video data streams 1404 to media player device 1010 and/or other media player devices.

Once virtual reality dataset 1400 has been generated (e.g., alongside a plurality of other virtual reality dataset options generated in the same manner but customized for other virtual reality experiences) and has been requested (e.g., by a selection of an entry within an experience selection data structure provided to media player device 1010), virtual reality dataset 1400 may be provided to media player device 1010. To this end, media player device 1010 and provider system 1102 (e.g. system 100) may interact in any suitable way. For example, media player device 1010 may access (e.g., from system 100) experience selection data structure 900, and select (e.g., by way of experience selection data structure 900) a particular entry (e.g., entry 904-8 in the example above) that corresponds to a particular virtual reality dataset (e.g., virtual reality dataset 1400) that is customized to a particular virtual reality experience (e.g., a virtual reality experience of user 1012 directing virtual viewpoint 304 to region 302-8 of 3D scene 202). Media player device 1010 may then provide data representative of the selected entry (e.g., entry 904-8) to system 100 and, in response, may receive the particular virtual reality dataset that is customized to the particular virtual reality experience (e.g., virtual reality dataset 1400). For example, media player device 1010 may receive a transport stream that includes a plurality of video data streams (e.g., transport stream 1402 including video data streams 1404) by way of network 1008.

Upon receiving the particular virtual reality dataset, media player device 1010 may process the particular virtual reality dataset to provide the particular virtual reality experience to user 1012. For example, using virtual reality dataset 1400, media player device 1010 may present virtual reality media content including object 204-1 and other objects near region 302-8 with a relatively high level of detail, while not wasting bandwidth on more detail related to other regions of 3D scene 202 than user 1012 is capable of appreciating from virtual viewpoint 304.

While system 100 is providing (e.g., streaming) virtual reality dataset 1400 to media player device 1010, system 100 may detect that media player device 1010 selects (e.g., by way of experience selection data structure 900) a different entry (e.g., an entry other than entry 904-8 that was selected previously) corresponding to a different virtual reality dataset that is customized to a different virtual reality experience. As such, in response to detecting that media player device 1010 selects the different entry, system 100 may provide the different virtual reality dataset that is customized to the different virtual reality experience to media player device 1010. For instance, if the original virtual reality experience was associated with region 302-8 of 3D scene 202, the new, different virtual reality experience may be associated with an region 302 of 3D scene 202 that is different from region 302-8, such as region 302-9. Accordingly, media player device 1010 may select the different entry corresponding to the different virtual reality dataset that is customized to the different virtual reality experience in response to receiving user input (e.g., from user 1012) indicative of a movement of virtual viewpoint 304 from a first position within region 302-8 to a second position within region 302-9 of 3D scene 202.

Virtual reality datasets provided to media player device 1010 may represent virtual reality media content that media player device 1010 may be configured to render. For example, as described above, virtual reality datasets may include or be representative of a plurality of 2D video data streams (e.g., 2D video data streams associated with color data and depth data associated with each view and virtualized projection) that may be rendered by media player device 1010 so as to present a view of 3D scene 202 virtually from any arbitrary virtual viewpoint within 3D scene 202 (e.g., including virtual viewpoints, such as virtual viewpoint 304, that do not align with any capture device view or customized view but that may be of interest to user 1012). The virtual reality datasets may be distributed by way of network 1108 to one or more media player devices such as media player device 1010 associated with user 1012. For example, a provider system such as provider systems 1002 or 1102 may provide different virtual reality datasets to media player device 1010 so that user 1012 may experience 3D scene 202 virtually using media player device 1010.

In some examples, it may be undesirable for user 1012 to be limited to one or more discrete positions within 3D scene 202. As such, the provider system may provide sufficient data within each virtual reality dataset provided to media player device 1010 to allow 3D scene 202 to be represented not only from views 402 and/or 702, but from any dynamically selectable virtual viewpoints corresponding to arbitrary virtual locations within 3D scene 202. For example, dynamically selectable virtual viewpoints may be selected by user 1012 while user 1012 is experiencing 3D scene 202 using media player device 1010.

As used herein, an "arbitrary virtual location" may refer to any virtual point in space associated with a representation of a 3D scene. For example, arbitrary virtual locations are not limited to fixed positions surrounding a 3D scene (e.g., fixed positions associated with views 402 and/or customized view 702), but also include all the positions between the positions associated with views 402 and views 702. In some examples, such arbitrary virtual locations may correspond to the most desirable virtual viewpoints within 3D scene 202. For instance, if 3D scene 202 includes a basketball game, user 1012 may dynamically select virtual viewpoints (e.g., such as virtual viewpoint 304) from which to experience the game that are in any arbitrary virtual location on the basketball court. For example, the user may dynamically select his or her virtual viewpoint to follow the basketball up and down the basketball court and experience the basketball game as if standing on the basketball court in the middle of the action of the game.

Figure 15:
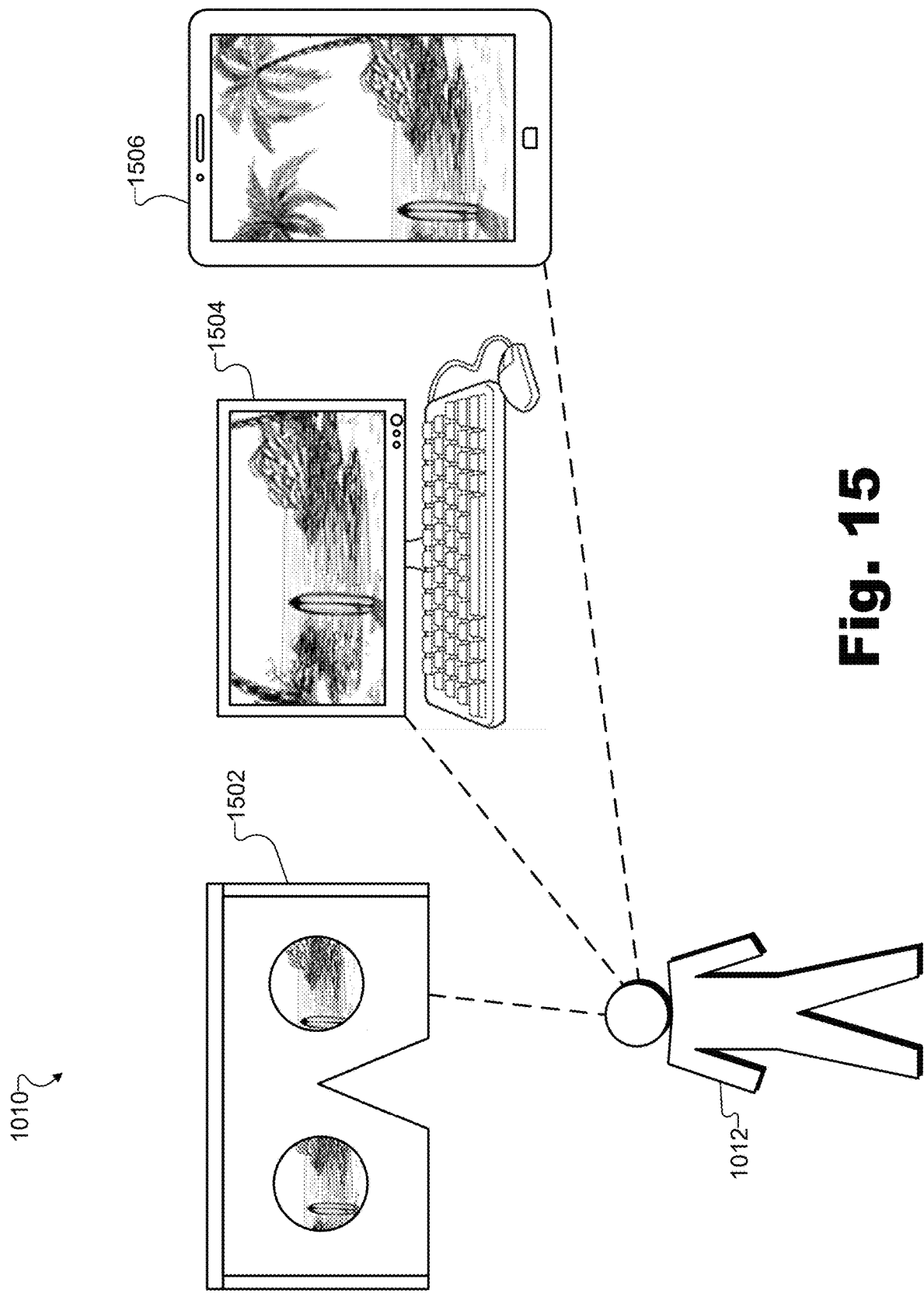
FIG. 15 illustrates various exemplary types of media player devices that may be used by a user to experience virtual reality media content according to principles described herein.

FIG. 15 shows various exemplary types of media player devices 1010 that may be used by user 1012 to experience virtual reality media content. Specifically, as shown, media player device 1010 may take one of several different form factors such as a head-mounted virtual reality device 1502 (e.g., a virtual reality gaming device) that includes a head-mounted display screen, a personal computer device 1504 (e.g., a desktop computer, laptop computer, etc.), a mobile or wireless device 1506 (e.g., a smartphone, a tablet device, etc., possibly mounted to the head of user 1012 by means of a head mount apparatus), or by any other device or configuration of devices that may serve a particular implementation to facilitate receiving and/or presenting virtual reality media content. Different types of media player devices (e.g., head-mounted virtual reality devices, personal computer devices, mobile devices, etc.) may provide different types of virtual reality experiences having different levels of immersiveness for user 1012.

Figure 16:
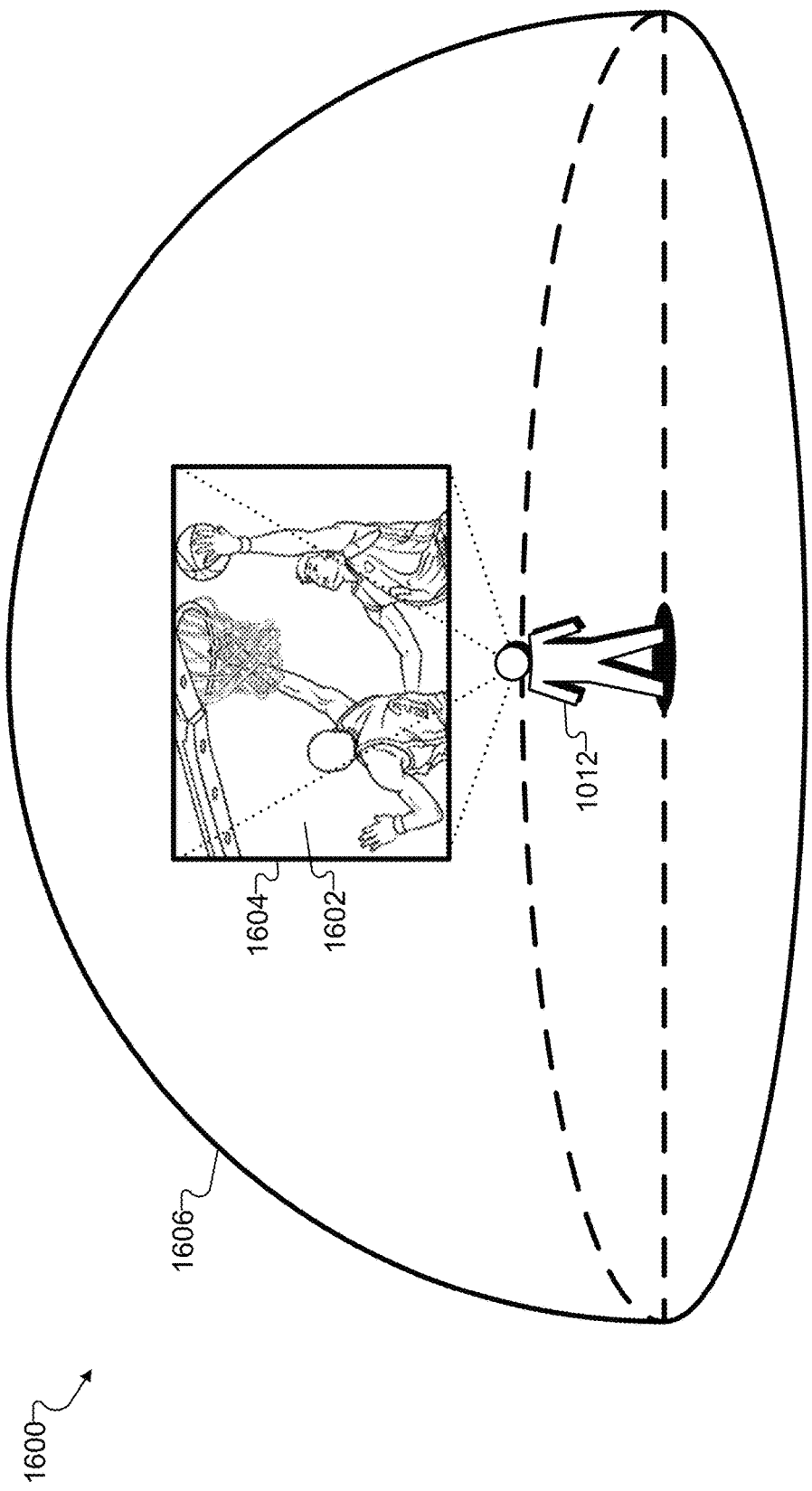
FIG. 16 illustrates an exemplary virtual reality experience in which a user is presented with exemplary virtual reality media content based on a 3D scene as experienced from a dynamically selectable virtual viewpoint corresponding to an exemplary arbitrary position with respect to the 3D scene according to principles described herein.

FIG. 16 illustrates an exemplary virtual reality experience 1600 in which user 1012 is presented with exemplary virtual reality media content representative of a 3D scene as experienced from a dynamically selectable virtual viewpoint corresponding to an exemplary arbitrary virtual location with respect to the real-world scene. Specifically, virtual reality media content 1602 is presented within a field of view 1604 that shows a 3D scene 1606 from a virtual viewpoint corresponding to an arbitrary virtual location right underneath a basketball standard within the representation of 3D scene 1606 where a shot is being made. User 1012 experiences 3D scene 1606 by providing user input (e.g., head movements, keyboard input, etc.) to look around and/or to move around (i.e., dynamically select a virtual viewpoint from which to experience) 3D scene 1606.

For example, field of view 1604 may provide a window through which user 1012 may easily and naturally look around a virtual representation of 3D scene 1606. Field of view 1604 may be presented by media player device 1010 (e.g., on a display screen of media player device 1010) and may include video depicting objects surrounding user 1012 within 3D scene 1606. Additionally, field of view 1604 may dynamically change in response to user input provided by user 1012 as user 1012 experiences 3D scene 1606. For example, media player device 1010 may detect user input (e.g., moving or turning the display screen upon which field of view 1604 is presented). In response, field of view 1604 may display different objects and/or objects seen from a different virtual viewpoint or virtual location in place of the objects seen from the previous virtual viewpoint or virtual location.

In FIG. 16, 3D scene 1606 is illustrated as a semi-sphere, indicating that user 1012 may look in any direction within 3D scene 1606 that is substantially forward, backward, left, right, and/or up from the virtual viewpoint of the location under the basketball standard that user 1012 has currently selected. In other examples, 3D scene 1606 may include an entire 360° by 180° sphere such that user 1012 may also look down. Additionally, user 1012 may move around to other locations within 3D scene 1606 (i.e., dynamically selecting different dynamically selectable virtual viewpoints). For example, user 1012 may select a virtual viewpoint at half court, a virtual viewpoint from the free-throw line facing the basketball standard, a virtual viewpoint suspended above the basketball standard, or the like.

Figure 17:
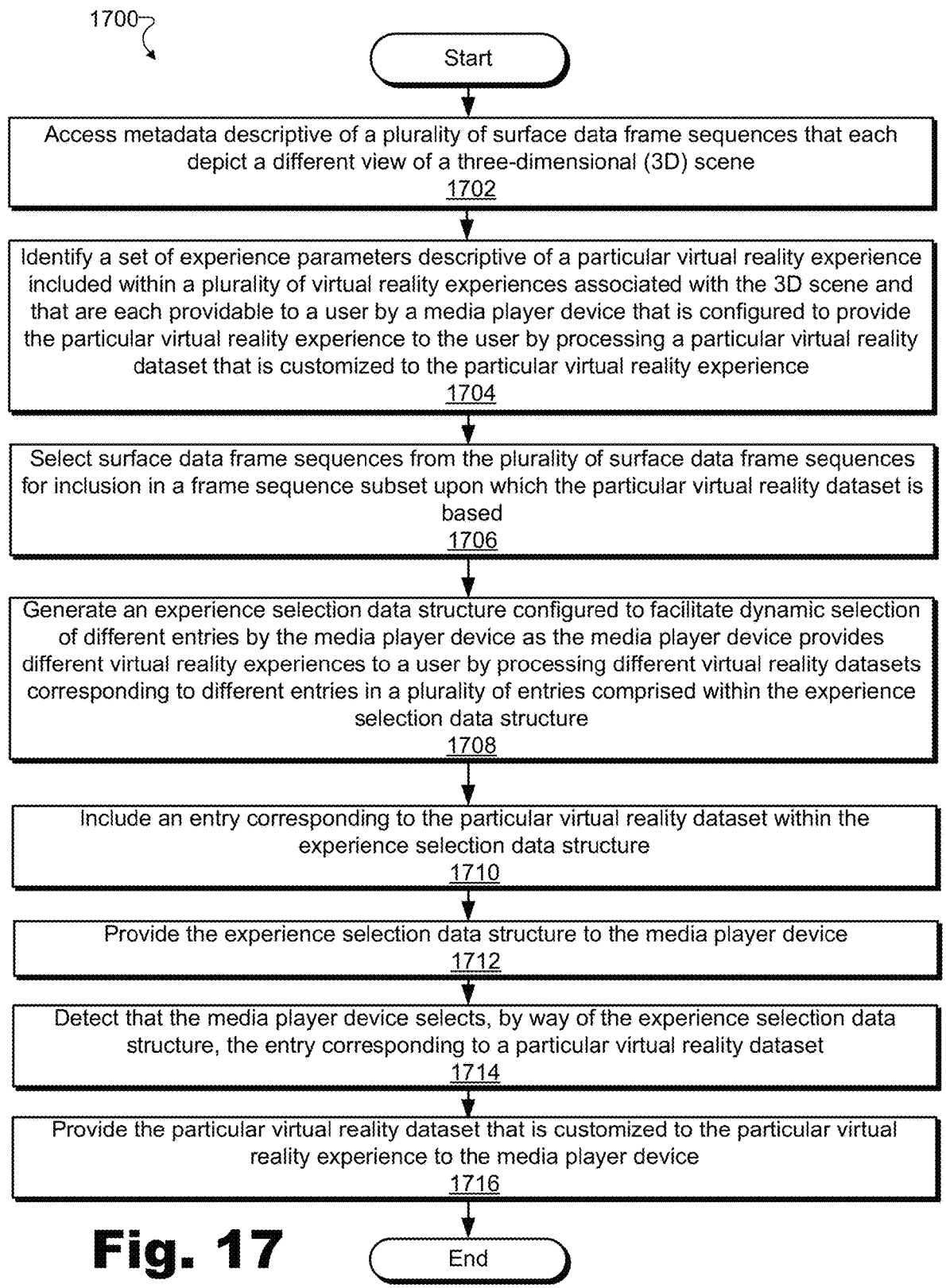
FIGS. 17-19 illustrate exemplary methods for customizing virtual reality data according to principles described herein.

FIG. 17 illustrates an exemplary method 1700 for customizing virtual reality data. While FIG. 17 illustrates exemplary operations according to one embodiment, other embodiments may omit, add to, reorder, and/or modify any of the operations shown in FIG. 17. One or more of the operations shown in FIG. 17 may be performed by system 100, an implementation thereof, and/or another system described above as being associated with (e.g., communicatively coupled to, configured to interoperate with, etc.) system 100.

In operation 1702, a virtual reality system may access metadata descriptive of a plurality of surface data frame sequences that each depict a different view of a 3D scene. Operation 1702 may be performed in any of the ways described herein.

In operation 1704, the virtual reality system may identify a set of experience parameters descriptive of a particular virtual reality experience. For example, the particular virtual reality experience may be included within a plurality of virtual reality experiences associated with the 3D scene and that are each providable to a user by a media player device. In some examples, the media player device may be configured to provide the particular virtual reality experience to the user by processing a particular virtual reality dataset that is customized to the particular virtual reality experience. Operation 1704 may be performed in any of the ways described herein.

In operation 1706, the virtual reality system may select surface data frame sequences from the plurality of surface data frame sequences for inclusion in a frame sequence subset upon which the particular virtual reality dataset is based. For instance, the surface data frame sequences may be selected for inclusion in the frame sequence subset based on the set of experience parameters identified in operation 1704 and/or based on the metadata associated with the plurality of data frame sequences accessed in operation 1702. Operation 1706 may be performed in any of the ways described herein.

In operation 1708, the virtual reality system may generate an experience selection data structure configured to facilitate dynamic selection of different entries. More specifically, the experience selection data structure may facilitate a media player device in dynamically selecting different entries from a plurality of entries included within the experience selection data structure as the media player device provides different virtual reality experiences to a user by processing different virtual reality datasets. In some examples, the plurality of entries may each correspond to a different virtual reality dataset that is customized to a different virtual reality experience included within the plurality of virtual reality experiences associated with the 3D scene. Operation 1708 may be performed in any of the ways described herein.

In operation 1710, the virtual reality system may include an entry corresponding to the particular virtual reality dataset within the experience selection data structure generated in operation 1708. For example, the virtual reality system may include the entry corresponding to the particular virtual reality dataset based on the selection, in operation 1706, of the surface data frame sequences for inclusion in the frame sequence subset upon which the particular virtual reality dataset is based. Operation 1710 may be performed in any of the ways described herein.

In operation 1712, the virtual reality system may provide the experience selection data structure to the media player device. Operation 1712 may be performed in any of the ways described herein.

In operation 1714, the virtual reality system may detect that the media player device selects the entry corresponding to the particular virtual reality dataset that is customized to the particular virtual reality experience. For example, the virtual reality system may detect, by way of the experience selection data structure generated in operation 1708, that the media player device selects the entry corresponding to the particular virtual reality dataset included within the experience selection data structure in operation 1710. Operation 1714 may be performed in any of the ways described herein.

In operation 1716, the virtual reality system may provide the particular virtual reality dataset that is customized to the particular virtual reality experience to the media player device. For example, the virtual reality system may provide the particular virtual reality dataset to the media player device in response to the detection, in operation 1714, that the media player device selects the entry corresponding to the particular virtual reality dataset. Operation 1716 may be performed in any of the ways described herein.

Figure 18:
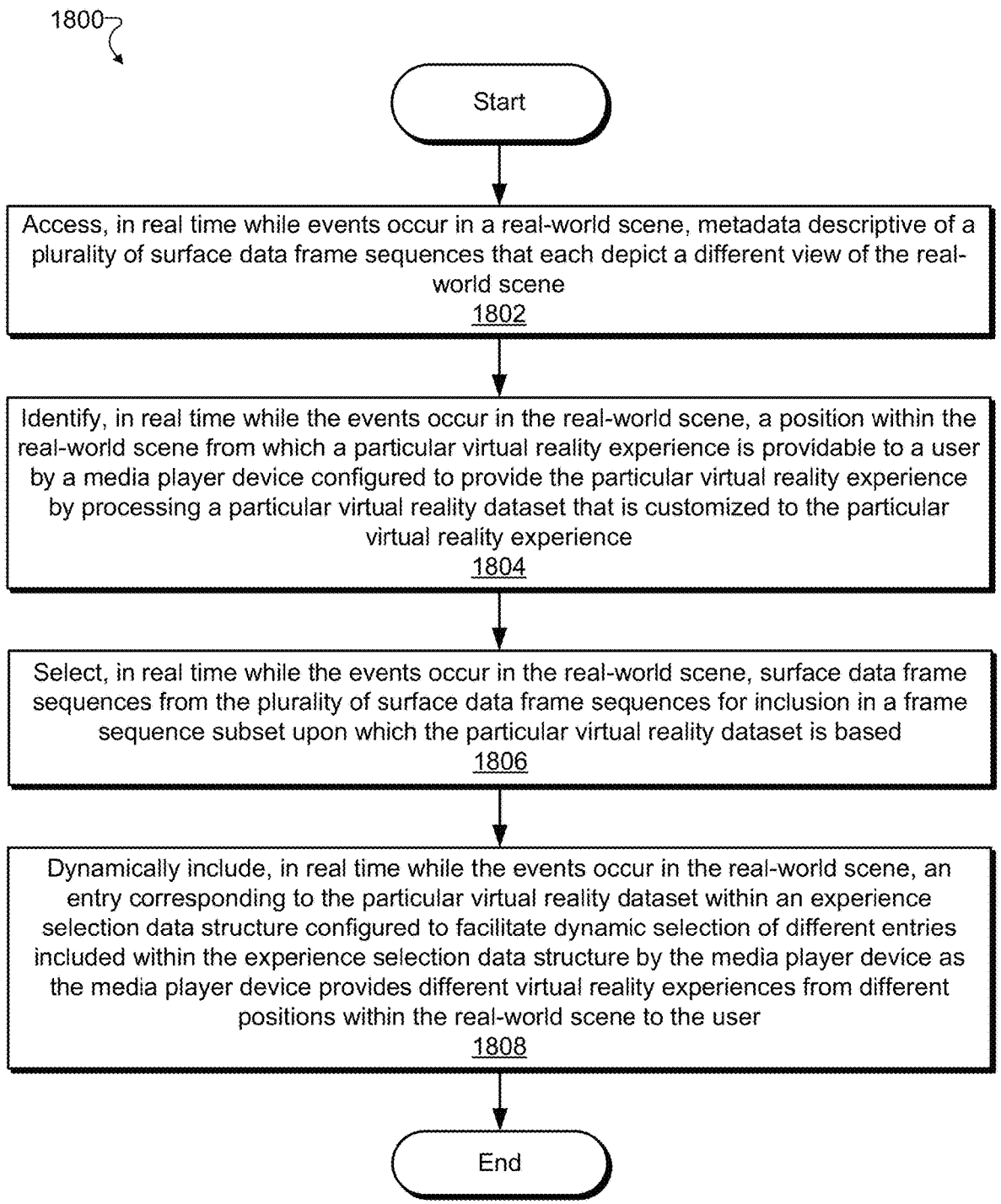

FIG. 18 illustrates an exemplary method 1800 for customizing virtual reality data. While FIG. 18 illustrates exemplary operations according to one embodiment, other embodiments may omit, add to, reorder, and/or modify any of the operations shown in FIG. 18. One or more of the operations shown in FIG. 18 may be performed by system 100, an implementation thereof, and/or another system described above as being associated with (e.g., communicatively coupled to, configured to interoperate with, etc.) system 100.

In operation 1802, a virtual reality system may access metadata descriptive of a plurality of surface data frame sequences that each depict a different view of a real-world scene. For example, the plurality of surface data frame sequences may include a virtualized surface data frame sequence that depicts a view of the real-world scene that is unaligned with views of the real-world scene that are captured by a plurality of capture devices disposed at different locations with respect to the real-world scene. In some implementations, operation 1802 may be performed in real time while events occur in the real-world scene. Operation 1802 may be performed in any of the ways described herein.

In operation 1804, the virtual reality system may identify a position within the real-world scene from which a particular virtual reality experience is providable to a user by a media player device. The media player device may be configured to provide the particular virtual reality experience to the user by processing a particular virtual reality dataset that is customized to the particular virtual reality experience. As with operation 1802, in certain implementations, operation 1804 may be performed in real time while the events occur in the real-world scene. Operation 1804 may be performed in any of the ways described herein.

In operation 1806, the virtual reality system may select surface data frame sequences from the plurality of surface data frame sequences for inclusion in a frame sequence subset upon which the particular virtual reality dataset is based. In some examples, the virtual reality system may select the surface data frame sequence for inclusion in the frame sequence subset based on the position identified in operation 1804 and/or based on the metadata associated with the plurality of data frame sequences accessed in operation 1802. As with operations 1802 and 1804, in certain implementations, operation 1806 may be performed in real time while the events occur in the real-world scene. Operation 1806 may be performed in any of the ways described herein.

In operation 1808, the virtual reality system may dynamically include an entry corresponding to the particular virtual reality dataset within an experience selection data structure. For example, the virtual reality system may dynamically include the entry corresponding to the particular virtual reality dataset based on the selection, operation 1806, of the surface data frame sequences for inclusion in the frame sequence subset upon which the particular virtual reality dataset is based. The experience selection data structure may be configured to facilitate dynamic selection of different entries from a plurality of entries included within the experience selection data structure. For example, the experience selection data structure may be configured to facilitate dynamic selection of the different entries by the media player device as the media player device provides different virtual reality experiences from different positions within the real-world scene to the user. The plurality of entries may each correspond to a different virtual reality dataset customized to a different virtual reality experience included within a plurality of virtual reality experiences from the different positions within the real-world scene. As with operations 1802 through 1806, in certain implementations, operation 1808 may be performed in real time while the events occur in the real-world scene. Operation 1808 may be performed in any of the ways described herein.

Figure 19:
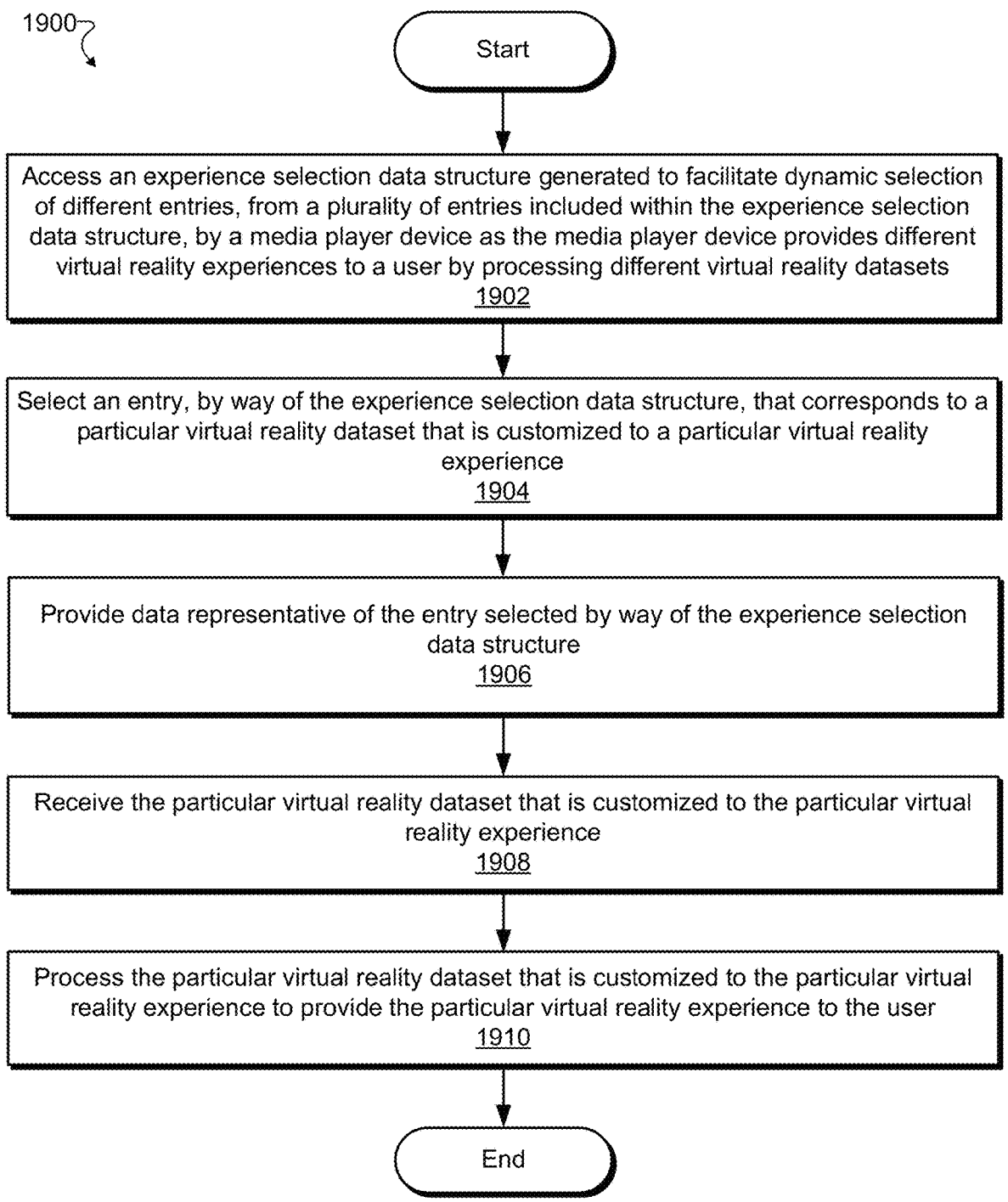

FIG. 19 illustrates an exemplary method 1900 for customizing virtual reality data. While FIG. 19 illustrates exemplary operations according to one embodiment, other embodiments may omit, add to, reorder, and/or modify any of the operations shown in FIG. 19. One or more of the operations shown in FIG. 19 may be performed by media player device 1010, an implementation thereof, and/or another media player device described herein or as may serve a particular implementation.

In operation 1902, a media player device may access, from a virtual reality system, an experience selection data structure that is generated by the virtual reality system. For example, the experience selection data structure may be configured to facilitate dynamic selection of different entries, from a plurality of entries included within the experience selection data structure, by the media player device as the media player device provides different virtual reality experiences to a user by processing different virtual reality datasets. In some examples, the plurality of entries included within the experience selection data structure may each correspond to a different virtual reality dataset that is customized to a different virtual reality experience included within a plurality of virtual reality experiences associated with a 3D scene. Operation 1902 may be performed in any of the ways described herein.

In operation 1904, the media player device may select an entry from the plurality of entries by way of the experience selection data structure. For example, the entry may correspond to a particular virtual reality dataset that is customized to a particular virtual reality experience. Operation 1904 may be performed in any of the ways described herein.

In operation 1906, the media player device may provide data representative of the entry selected by way of the experience selection data structure to the virtual reality system. Operation 1906 may be performed in any of the ways described herein.

In operation 1908, the media player device may receive the particular virtual reality dataset that is customized to the particular virtual reality experience. For example, the media player device may receive the particular virtual reality dataset from the virtual reality system in response to the providing of the data representative of the entry in operation 1906. Operation 1908 may be performed in any of the ways described herein.

In operation 1910, the media player device may process the particular virtual reality dataset received in operation 1908 and that is customized to the particular virtual reality experience. By processing the particular virtual reality dataset, the media player device may provide the particular virtual reality experience to the user. Operation 1910 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 20:
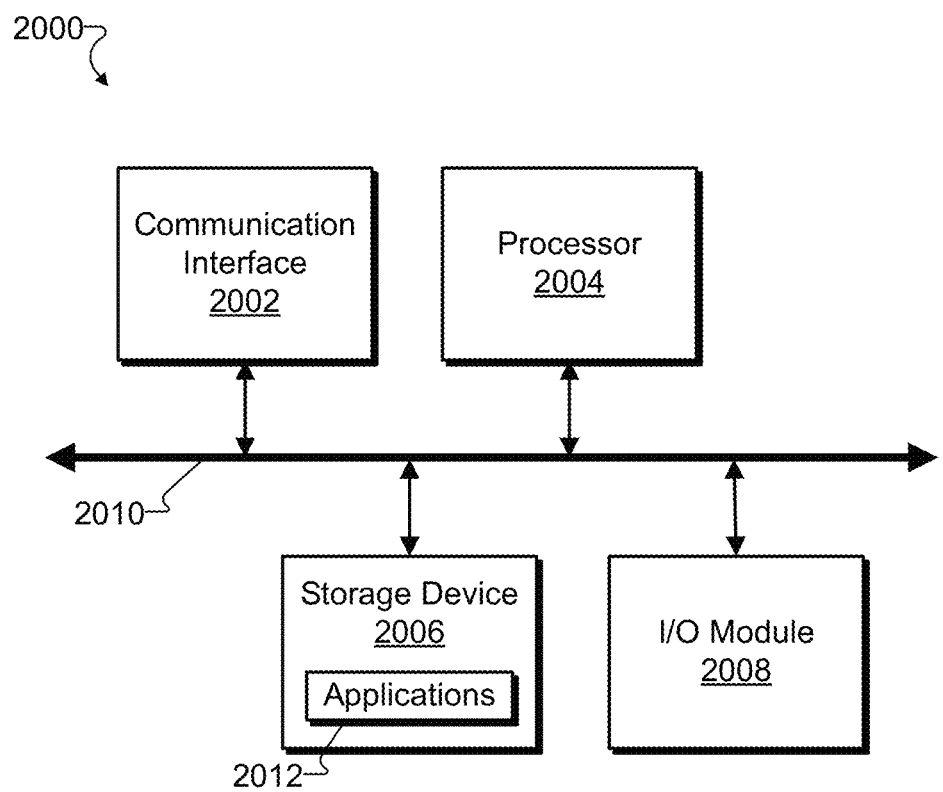
FIG. 20 illustrates an exemplary computing device according to principles described herein.

FIG. 20 illustrates an exemplary computing device 2000 that may be specifically configured to perform one or more of the processes described herein. As shown in FIG. 20, computing device 2000 may include a communication interface 2002, a processor 2004, a storage device 2006, and an input/output ("I/O") module 2008 communicatively connected via a communication infrastructure 2010. While an exemplary computing device 2000 is shown in FIG. 20, the components illustrated in FIG. 20 are not intended to be limiting. Additional or alternative components may be used in other embodiments. Components of computing device 2000 shown in FIG. 20 will now be described in additional detail.

Communication interface 2002 may be configured to communicate with one or more computing devices. Examples of communication interface 2002 include, without limitation, a wired network interface (such as a network interface card), a wireless network interface (such as a wireless network interface card), a modem, an audio/video connection, and any other suitable interface.

Processor 2004 generally represents any type or form of processing unit (e.g., a central processing unit and/or a graphics processing unit) capable of processing data or interpreting, executing, and/or directing execution of one or more of the instructions, processes, and/or operations described herein. Processor 2004 may direct execution of operations in accordance with one or more applications 2012 or other computer-executable instructions such as may be stored in storage device 2006 or another computer-readable medium.

Storage device 2006 may include one or more data storage media, devices, or configurations and may employ any type, form, and combination of data storage media and/or device. For example, storage device 2006 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 2006. For example, data representative of one or more executable applications 2012 configured to direct processor 2004 to perform any of the operations described herein may be stored within storage device 2006. In some examples, data may be arranged in one or more databases residing within storage device 2006.

I/O module 2008 may include one or more I/O modules configured to receive user input and provide user output. One or more I/O modules may be used to receive input for a single virtual reality experience. I/O module 2008 may include any hardware, firmware, software, or combination thereof supportive of input and output capabilities. For example, I/O module 2008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 2008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 2008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 2000. For example, one or more applications 2012 residing within storage device 2006 may be configured to direct processor 2004 to perform one or more operations or functions associated with experience selection data structure management facility 102 or virtual reality dataset management facility 104 of system 100 (see FIG. 1). Likewise, storage facility 106 of system 100 may be implemented by or within storage device 2006.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
accessing, by a virtual reality system, metadata descriptive of a plurality of frame sequences that each include two-dimensional (2D) color data frames and depth data frames that depict a different view of a three-dimensional (3D) scene;

identifying, by the virtual reality system, a set of experience parameters defining a particular virtual reality experience associated with the 3D scene and that is to be experienced by a user using a media player device;
selecting, by the virtual reality system based on the metadata and the set of experience parameters, frame sequences from the plurality of frame sequences for inclusion in a frame sequence subset that is customized to the particular virtual reality experience and that collectively includes data sufficient to allow the media player device to generate a virtual 3D representation of the 3D scene; and
providing, by the virtual reality system to the media player device, the selected frame sequences included within the frame sequence subset.

2. The method of claim 1, further comprising:
accessing, by the virtual reality system, the frame sequences selected for inclusion in the frame sequence subset; and
generating, by the virtual reality system based on the accessed frame sequences selected for inclusion in the frame sequence subset, a virtual reality dataset associated with the frame sequence subset customized to the particular virtual reality experience;
wherein the providing of the selected frame sequences included within the frame sequence subset comprises transmitting the virtual reality dataset to the media player device.

3. The method of claim 1, further comprising:
including, by the virtual reality system based on the selecting of the frame sequences for inclusion in the frame sequence subset, an entry corresponding to the particular virtual reality experience within an experience selection data structure;
wherein:
the experience selection data structure is configured to facilitate the media player device in dynamically selecting different entries, from a plurality of entries included within the experience selection data structure, as the media player device provides different virtual reality experiences to the user, and
the different entries in the plurality of entries correspond to different frame sequence subsets customized to different virtual reality experiences provided by the media player device to the user.

4. The method of claim 3, further comprising:
providing, by the virtual reality system to the media player device, the experience selection data structure;
receiving, by the virtual reality system as facilitated by the experience selection data structure, a request from the media player device to access the frame sequence subset that is customized to the particular virtual reality experience; and
providing, by the virtual reality system to the media player device in response to the receiving of the request, the frame sequence subset that is customized to the particular virtual reality experience.

5. The method of claim 1, wherein the identified set of experience parameters defining the particular virtual reality experience includes an experience parameter representative of a position within the 3D scene, the position associated with a vantage point from which the particular virtual reality experience is provided to the user.

6. The method of claim 5, wherein the frame sequences selected for inclusion in the frame sequence subset that is customized to the particular virtual reality experience collectively surround, along at least two dimensions, the position within the 3D scene that is associated with the vantage point from which the particular virtual reality experience is provided to the user.

7. The method of claim 1, wherein:
the identifying of the set of experience parameters defining the particular virtual reality experience is performed dynamically such that the particular virtual reality experience is identified as a non-predetermined virtual reality experience; and
the selecting of the frame sequences for inclusion in the frame sequence subset that is customized to the non-predetermined virtual reality experience is performed dynamically in response to the dynamic identifying of the set of experience parameters.

8. The method of claim 1, wherein:
the 3D scene includes elements of a real-world scene captured by a plurality of capture devices disposed at different locations with respect to the real-world scene so as to capture different views of the real-world scene; and
the plurality of frame sequences includes a virtualized frame sequence that depicts a view of the real-world scene that is unaligned with the different views of the real-world scene captured by the plurality of capture devices.

9. The method of claim 8, wherein:
the identifying of the set of experience parameters defining the particular virtual reality experience is performed dynamically such that the particular virtual reality experience is identified as a non-predetermined virtual reality experience;
the method further comprises generating, by the virtual reality system in response to the dynamic identifying of the set of experience parameters, the virtualized frame sequence that depicts the view of the real-world scene that is unaligned with the different views captured by the plurality of capture devices; and
the frame sequence subset that is customized to the non-predetermined virtual reality experience includes the virtualized frame sequence.

10. A system comprising:
a memory storing instructions; and
a processor communicatively coupled to the memory and configured to execute the instructions to:
access metadata descriptive of a plurality of frame sequences that each include two-dimensional (2D) color data frames and depth data frames that depict a different view of a three-dimensional (3D) scene,
identify a set of experience parameters defining a particular virtual reality experience associated with the 3D scene and that is to be experienced by a user using a media player device,
select, based on the metadata and the set of experience parameters, frame sequences from the plurality of frame sequences for inclusion in a frame sequence subset that is customized to the particular virtual reality experience and that collectively includes data sufficient to allow the media player device to generate a virtual 3D representation of the 3D scene, and
provide the selected frame sequences included within the frame sequence subset to the media player device.

11. The system of claim 10, wherein:
the processor is further configured to execute the instructions to
access the frame sequences selected for inclusion in the frame sequence subset, and generate, based on the accessed frame sequences selected for inclusion in the frame sequence subset, a virtual reality dataset associated with the frame sequence subset customized to the particular virtual reality experience; and
the providing of the selected frame sequences included within the frame sequence subset comprises transmitting the virtual reality dataset to the media player device.

12. The system of claim 10, wherein:
the processor is further configured to execute the instructions to include, based on the selecting of the frame sequences for inclusion in the frame sequence subset, an entry corresponding to the particular virtual reality experience within an experience selection data structure;
the experience selection data structure is configured to facilitate the media player device in dynamically selecting different entries, from a plurality of entries included within the experience selection data structure, as the media player device provides different virtual reality experiences to the user; and
the different entries in the plurality of entries correspond to different frame sequence subsets customized to the different virtual reality experiences provided by the media player device to the user.

13. The system of claim 12, wherein the processor is further configured to execute the instructions to:
provide the experience selection data structure to the media player device;
receive, as facilitated by the experience selection data structure, a request from the media player device to access the frame sequence subset that is customized to the particular virtual reality experience; and
provide, to the media player device in response to the receiving of the request, the frame sequence subset that is customized to the particular virtual reality experience.

14. The system of claim 10, wherein the identified set of experience parameters defining the particular virtual reality experience includes an experience parameter representative of a position within the 3D scene, the position associated with a vantage point from which the particular virtual reality experience is provided to the user.

15. The system of claim 14, wherein the frame sequences selected for inclusion in the frame sequence subset that is customized to the particular virtual reality experience collectively surround, along at least two dimensions, the position within the 3D scene that is associated with the vantage point from which the particular virtual reality experience is provided to the user.

16. The system of claim 10, wherein:
the identifying of the set of experience parameters defining the particular virtual reality experience is performed dynamically such that the particular virtual reality experience is identified as a non-predetermined virtual reality experience; and
the selecting of the frame sequences for inclusion in the frame sequence subset that is customized to the non-predetermined virtual reality experience is performed dynamically in response to the dynamic identifying of the set of experience parameters.

17. The system of claim 10, wherein:
the 3D scene includes elements of a real-world scene captured by a plurality of capture devices disposed at different locations with respect to the real-world scene so as to capture different views of the real-world scene; and the plurality of frame sequences includes a virtualized frame sequence that depicts a view of the real-world scene that is unaligned with the different views of the real-world scene captured by the plurality of capture devices.

18. The system of claim 17, wherein:

the identifying of the set of experience parameters defining the particular virtual reality experience is performed dynamically such that the particular virtual reality experience is identified as a non-predetermined virtual reality experience;

the method further comprises generating, by the virtual reality system in response to the dynamic identifying of the set of experience parameters, the virtualized frame sequence that depicts the view of the real-world scene that is unaligned with the different views captured by the plurality of capture devices; and the frame sequence subset that is customized to the non-predetermined virtual reality experience includes the virtualized frame sequence.

19. A non-transitory computer-readable medium storing instructions that, when executed, direct a processor of a computing device to:

access metadata descriptive of a plurality of frame sequences that each include two-dimensional (2D) color data frames and depth data frames that depict a different view of a three-dimensional (3D) scene;

identify a set of experience parameters defining a particular virtual reality experience associated with the 3D scene and that is to be experienced by a user using a media player device;

select, based on the metadata and the set of experience parameters, frame sequences from the plurality of frame sequences for inclusion in a frame sequence subset that is customized to the particular virtual reality experience and that collectively includes data sufficient to allow the media player device to generate a virtual 3D representation of the 3D scene; and provide the selected frame sequences included within the frame sequence subset to the media player device.

20. The non-transitory computer-readable medium of claim 19, wherein:

the instructions further direct the processor to
access the frame sequences selected for inclusion in the frame sequence subset, and
generate, based on the accessed frame sequences selected for inclusion in the frame sequence subset, a virtual reality dataset associated with the frame sequence subset customized to the particular virtual reality experience; and the providing of the selected frame sequences included within the frame sequence subset comprises transmitting the virtual reality dataset to the media player device.

* * * * *